(12) United States Patent
Jing et al.

(10) Patent No.: US 11,890,670 B2
(45) Date of Patent: Feb. 6, 2024

(54) PRODUCTION LINES AND METHODS FOR CERAMIC SHELL MAKING

(71) Applicant: TAIZHOU XINYU PRECISION MANUFACTURE CO., LTD., Jiangsu (CN)

(72) Inventors: Jian Jing, Taizhou (CN); Mingfeng Wang, Taizhou (CN)

(73) Assignee: TAIZHOU XINYU PRECISION MANUFACTURE CO., LTD., Taizhou (CN)

( * ) Notice: Subject to any disclaimer, the term of this patent is extended or adjusted under 35 U.S.C. 154(b) by 0 days.

(21) Appl. No.: 18/051,499

(22) Filed: Oct. 31, 2022

(65) Prior Publication Data

US 2023/0078326 A1    Mar. 16, 2023

Related U.S. Application Data

(63) Continuation of application No. 17/646,872, filed on Jan. 4, 2022, now Pat. No. 11,484,938, which is a
(Continued)

(51) Int. Cl.
*B22C 9/12* (2006.01)
*B22C 9/04* (2006.01)
(Continued)

(52) U.S. Cl.
CPC ............... *B22C 9/12* (2013.01); *B22C 9/04* (2013.01); *B25J 11/008* (2013.01); *B65G 47/905* (2013.01)

(58) Field of Classification Search
CPC .. B22C 9/04; B22C 9/12; B22C 13/08; B22C 13/085
See application file for complete search history.

(56) References Cited

U.S. PATENT DOCUMENTS

| 3,249,972 A | 5/1966 | Watts et al. |
| 5,460,217 A | 10/1995 | Sakurai et al. |

(Continued)

FOREIGN PATENT DOCUMENTS

| CN | 202367168 U | 8/2012 |
| CN | 202621829 | 12/2012 |

(Continued)

OTHER PUBLICATIONS

International Search Report in PCT/CN2019/120013 dated Aug. 19, 2020, 6 pages.
(Continued)

*Primary Examiner* — Kevin P Kerns
*Assistant Examiner* — Steven S Ha
(74) *Attorney, Agent, or Firm* — METIS IP LLC

(57) ABSTRACT

The present disclosure discloses a production line for ceramic shell making and a method for ceramic shell making. The production line may include a conveyor chain system, a robotic arm, a slurry coating device, and a sanding device. The conveyor chain system may be configured to convey a batch of modules. The robotic arm may be configured to replace and remove one or more modules among the batch of modules relative to the conveyor chain system and hold the one or more modules during a plurality of subsequent operations. The robotic arm may be configured to be moveable to a plurality of positions each of which corresponds to one of a plurality of stations. The slurry coating device may be configured to coat the one or more modules in slurry. The sanding device may be configured to sand the one or more modules.

11 Claims, 27 Drawing Sheets

Related U.S. Application Data continuation of application No. PCT/CN2019/120013, filed on Nov. 21, 2019.

(51) Int. Cl.
  *B25J 11/00* (2006.01)
  *B65G 47/90* (2006.01)

(56) References Cited

U.S. PATENT DOCUMENTS

| | | | | |
|---|---|---|---|---|
| 5,465,780 | A | * | 11/1995 | Muntner ............... B28B 11/12 164/369 |
| 6,453,210 | B1 | | 9/2002 | Belotserkovskiy et al. |
| 2017/0100770 | A1 | | 4/2017 | Biederman et al. |

FOREIGN PATENT DOCUMENTS

| | | | |
|---|---|---|---|
| CN | 102950261 | A | 3/2013 |
| CN | 104226921 | A | 12/2014 |
| CN | 105251941 | A | 1/2016 |
| CN | 205008540 | U | 2/2016 |
| CN | 205020748 | U | 2/2016 |
| CN | 205341815 | U | 6/2016 |
| CN | 205702299 | U | 11/2016 |
| CN | 106180560 | A | 12/2016 |
| CN | 205763653 | U | 12/2016 |
| CN | 105562607 | B | 7/2017 |
| CN | 107486546 | A | 12/2017 |
| CN | 206997692 | U | 2/2018 |
| CN | 207205198 | U | 4/2018 |
| CN | 108296444 | A | 7/2018 |
| CN | 207952531 | U | 10/2018 |
| CN | 207957025 | U | 10/2018 |
| CN | 207971385 | U | 10/2018 |
| CN | 208067255 | U | 11/2018 |
| CN | 109365750 | A | 2/2019 |
| CN | 109807289 | A | 5/2019 |
| CN | 109986030 | A | 7/2019 |
| CN | 209209673 | U | 8/2019 |
| JP | H1071452 | A | 3/1998 |
| JP | 2011241085 | A | 12/2011 |
| TW | 221803 | B | 3/1994 |
| TW | M503957 | U | 7/2015 |

OTHER PUBLICATIONS

Written Opinion in PCT/CN2019/120013 dated Aug. 19, 2020, 6 pages.
Extended European Search Report in European Application No. 19953251.6 dated Apr. 21, 2022, 10 pages.

* cited by examiner

3100

```
┌─────────────────────────────────────┐
│ Placing a plurality of modules onto │ — 3110
│      a conveyor chain system        │
└─────────────────────────────────────┘
                  ↓
┌─────────────────────────────────────┐
│  Conveying one or more modules      │ — 3120
│  among the plurality of modules to  │
│  a station using the conveyor       │
│  chain system                       │
└─────────────────────────────────────┘
                  ↓
┌─────────────────────────────────────┐
│ Removing, using a robotic arm, the  │ — 3130
│ one or more modules from the        │
│ conveyor chain system, and coating  │
│ the one or more modules in slurry   │
│ and sanding the one or more modules │
│ on one or more stations             │
└─────────────────────────────────────┘
                  ↓
┌─────────────────────────────────────┐
│ Replacing, using the robotic arm,   │ — 3140
│ the one or more modules onto the    │
│ conveyor chain system               │
└─────────────────────────────────────┘
                  ↓
┌─────────────────────────────────────┐
│ Conveying, using the conveyor chain │ — 3150
│ system, the one or more modules to  │
│ a drying process to be dried        │
└─────────────────────────────────────┘
```

```
┌─────────────────────────────────────┐
│ Causing a robotic arm to clamp a    │ ~ 3210
│ module from a conveyor chain system │
└─────────────────────────────────────┘
                  ↓
┌─────────────────────────────────────┐
│ Causing, using the robotic arm, the │ ~ 3220
│ module to rotate to a first station,│
│ and transferring a first slurry tank│
│ including a first layer of slurry to│
│ a slurry coating station so as to   │
│ coat the module in the first layer  │
│ of slurry                           │
└─────────────────────────────────────┘
                  ↓
┌─────────────────────────────────────┐
│ Causing, using the robotic arm, the │ ~ 3230
│ module to rotate to a second station│
│ and moving a sanding unit including │
│ a first layer of sand to a sanding  │
│ station so as to rain the first     │
│ layer of sand to the module         │
└─────────────────────────────────────┘
                  ↓
┌─────────────────────────────────────┐
│ Causing the robotic arm to rotate   │ ~ 3240
│ the sanded module to a removing and │
│ replacing station, and hanging the  │
│ sanded module back to the conveyor  │
│ chain system                        │
└─────────────────────────────────────┘
```

FIG. 32

PRODUCTION LINES AND METHODS FOR CERAMIC SHELL MAKING

CROSS-REFERENCE TO RELATED APPLICATIONS

The application is a Continuation of U.S. application Ser. No. 17/646,872, filed on Jan. 4, 2022, which is a Continuation of International Application No. PCT/CN2019/120013 filed on Nov. 21, 2019, the contents of which are hereby incorporated by reference.

TECHNICAL FIELD

The present disclosure relates to precision casting, and in particular, to production lines and methods for ceramic shell making.

BACKGROUND

A production process of a lost-wax investment casting includes wax injection, wax deburring, wax cluster assembling, shell making, shell pre-heating, pouring, shell removing, post-processing, inspection, etc. As used herein, the process for shell making mainly includes slurry coating, sanding, and drying. A traditional process for shell making usually involves manual operations. During an operation for slurry coating, an operator, by holding a metal support rod on which a wax cluster (also referred to as a module) is attached, moves the wax cluster up and down and rotates the wax cluster in the slurry, so that the outer surfaces of the wax cluster are completely coated with the slurry. After the wax cluster are coated in slurry, the wax cluster is sanded. During an operation for sanding, the operator, by holding the metal support rod, places the wax cluster in a sanding machine and moves (e.g., by way of rotating, tilting, etc.) the wax cluster, so that the wax cluster may be uniformly sanded. After the sanding, the wax cluster is dried. The above operations are repeated so as to coat the wax cluster with multilayers of ceramic materials to form a ceramic shell. Such a process for ceramic shell making is labor intensive, inefficient, and environmentally unfriendly. Since the coating includes chemicals (e.g., an adhesion agent, etc.), the chemicals may cause harm to the operator. In addition, during the operation for sanding, sand may cause harm to the operator, by seriously damaging the health of the operator. Therefore, it is desirable to provide production lines for ceramic shell making that may reduce the labor intensity of the operator and improve the operation efficiency.

SUMMARY

The purpose of the present disclosure is to provide a production line for ceramic shell making. The production line may include a conveyor chain system, a robotic arm, a slurry coating device, and a sanding device. The conveyor chain system may be configured to convey a batch of modules. The robotic arm may be configured to remove and replace one or more modules among the batch of modules relative to the conveyor chain system and hold the one or more modules during a plurality of subsequent operations. The robotic arm may be configured to be moveable to a plurality of positions each of which corresponds to one of a plurality of stations. The slurry coating device may be configured to coat the one or more modules in slurry. The sanding device may be configured to sand the one or more modules.

In some embodiments, the production line may further include a control center. The control center may be operably connected with the conveyor chain system and the robotic arm, respectively, to cause, based on a first instruction, the conveyor chain system and the robotic arm to cooperate with each other.

In some embodiments, the slurry coating device may include a plurality of slurry tanks. The control center may be operably connected with the slurry coating device to cause, based on a third instruction, the slurry coating device to move so as to transfer a slurry tank including a corresponding type of slurry to a first designated position.

In some embodiments, the sanding device may include a plurality of sanding machines. The control center may be operably connected with the sanding device to cause, based on a second instruction, a sanding machine including a corresponding type of sand to move to a second designated position.

The present disclosure provides a sorting dustless sanding machine. The sorting dust-free sanding machine may include a sand hopper, a screen mesh, a bunker, a dust collection device, a lower dust suction port, and a filtration device. The filtration device may include a belt screen mesh, a waste collection tank, a cleaning tank, a blade, and a drying device. The sand hopper may be a rectangular container with an upward opening. A downward outlet of the sand hopper located at a top floor may be against the screen mesh disposed below the sand hopper. The bunker may be disposed at an inner side below the screen mesh. The dust collection device may be arranged on a front side wall of the sand hopper so as to form a first fixed-point dust suction structure during a sand falling stage of the sand hopper. The lower dust suction port may be arranged on left and right sides between the sand hopper and the screen mesh so as to form a second fixed-point dust suction structure during the sand falling stage of the sand hopper. The filtration device may be located directly below the sand hopper. The belt screen mesh arranged on the filtration device may be driven cyclically by the conveyor chain system. A flat section of the belt screen mesh disposed in a frame shape may be placed on the screen mesh. Each of the waste collection tank and the cleaning tank may be a rectangular container with an upward opening. The waste collection tank and the cleaning tank may be mounted at a bottom portion of one end of the belt screen mesh along a circulation direction, respectively. The blade may be disposed between the opening portion of the waste collection tank and the belt screen mesh. The drying device may be disposed at a bottom portion of the sanding machine. The drying device may be parallel to the cleaned belt screen mesh output by the cleaning tank so as to form a fixed-point air-dry structure for the belt screen mesh.

In some embodiments, a surface of the belt screen mesh may be coated with a coating that does not get wet.

In some embodiments, the surface of the belt screen mesh may be disposed with a coating of polytetrafluoroethylene resin.

In some embodiments, a width of the blade may be at least equal to a width of the belt screen mesh.

In some embodiments, the slurry coating device may include a carousel configured to rotate in a controlled manner. The plurality of slurry tanks may be disposed on the carousel. The carousel may be configured to rotate, based on the third instruction, to transfer the slurry tank including the corresponding type of slurry to the first designated position.

In some embodiments, the slurry coating device may further include one or more rotation bases configured for one or more of the plurality of slurry tanks. Each of the one or more rotation bases may be configured to drive a corresponding slurry tank to rotate.

In some embodiments, the sanding device may include a powered motion mechanism. The control center may be configured to cause the sanding machine including the corresponding type of sand to move, by the powered motion mechanism, to the second designated position.

Another aspect of the present disclosure provides a method for ceramic shell making based on a production line. The method may include placing a plurality of modules onto a conveyor chain system; conveying one or more modules among the plurality of modules to a station using the conveyor chain system; removing, using a robotic arm, the one or more modules from the conveyor chain system, and coating the one or more modules in slurry and sanding the one or more modules at one or more stations; replacing, using the robotic arm, the one or more modules onto the conveyor chain system; and conveying, using the conveyor chain system, the one or more modules to a drying process to be dried.

In some embodiments, the removing, using a robotic arm, the one or more modules from the conveyor chain system, and coating the one or more modules in slurry and sanding the one or more modules at the one or more stations may include causing the one or more modules to be removed from the conveyor chain system, and coated a first layer of slurry in a slurry tank of a slurry coating device, and raining a first layer of sand using a sanding machine of a sanding device; and causing the robotic arm to replace the one or more modules onto the conveyor chain system, and causing the slurry coating device and the sanding device to shift so as to coat a next layer of slurry and rain a next layer of sand.

In some embodiments, the causing the one or more modules to be removed from the conveyor chain system, and coated a first layer of slurry in a slurry tank of a slurry coating device and rained a first layer of sand using a sanding machine may include causing the slurry coating device to move so as to transfer the slurry tank to a first designated position; causing the sanding device to move so as to transfer the sanding machine to a second designated position; and causing the one or more modules to be removed from the conveyor chain system, moved to a position where the slurry tank is located to be coated the first layer of slurry, and moved to a position where the sanding machine is located to be rained the first layer of sand.

In some embodiments, the robotic arm may cause the one or more modules to rotate during the coating of the first layer of slurry and the raining of the first layer of sand.

In some embodiments, the drying process may include causing the one or more modules to rotate so as to be uniformly air-dried when wind is blown to the one or more modules hanged on the conveyor chain system.

A further aspect of the present disclosure provides a slurry coating device that can automatically shift a plurality of slurry tanks. The slurry coating device may include a carousel configured to rotate in a controlled manner and a controller. The plurality of slurry tanks may be disposed on the carousel. The controller may be configured to cause the carousel to rotate, based on an instruction, to transfer one slurry tank among the plurality of slurry tanks to a designated position.

In some embodiments, the slurry coating device may further include one or more rotation bases configured for one or more of the plurality of slurry tanks. Each of the one or more rotation bases may be configured to drive a corresponding slurry tank to rotate.

In some embodiments, the controller may be further configured to cause the one or more rotation bases to rotate based on the instruction, thereby implementing the rotation of the slurry tank.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 31 is a flowchart illustrating an exemplary process for ceramic shell making based on a production line for ceramic shell making according to some embodiments of the present disclosure; and FIG. 32 is a flowchart illustrating an exemplary process for coating a first layer of slurry and raining a first layer of sand in a production line for ceramic shell making according to some embodiments of the present disclosure.

DETAILED DESCRIPTION

Figure 1:
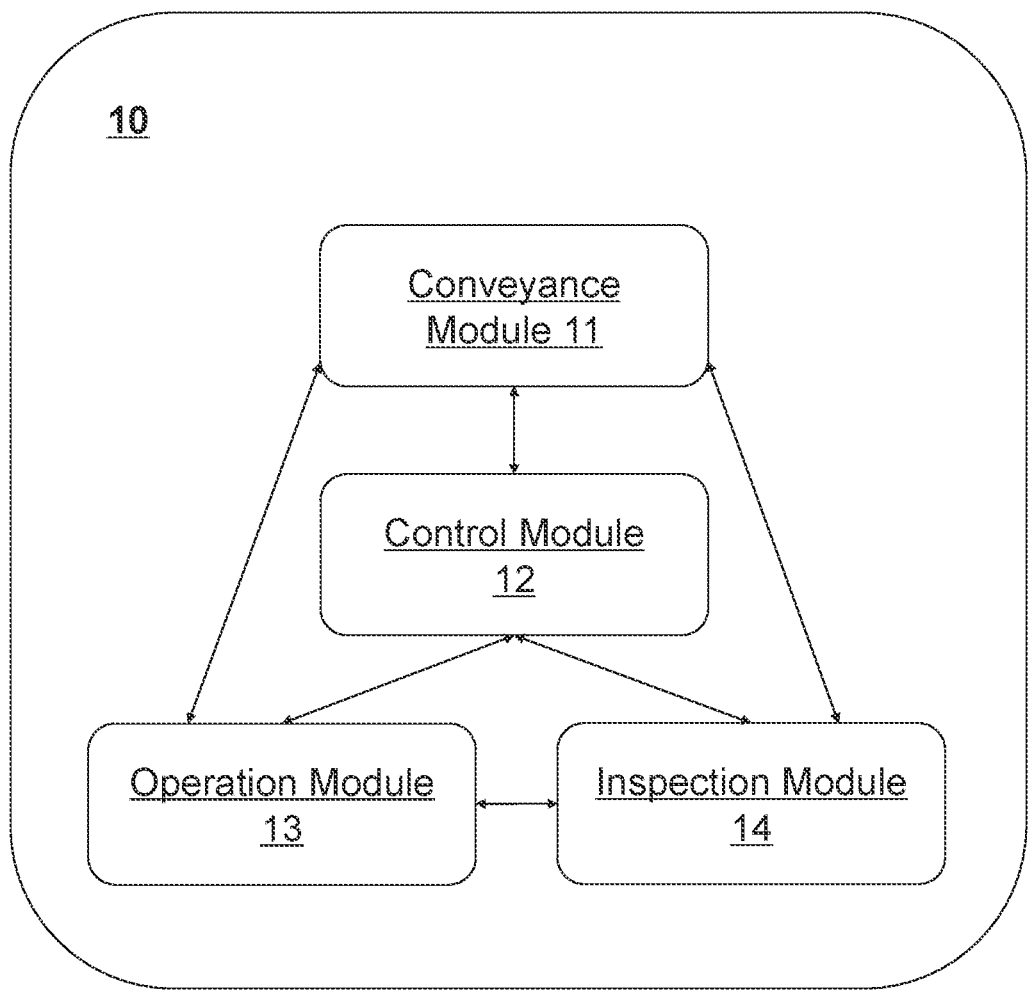
FIG. 1 is a block diagram illustrating a system of a production line for ceramic shell making according to some embodiments of the present disclosure.

Exemplary embodiments or embodiments will be described in detail herein, and examples are illustrated in the drawings. Where the following description refers to the drawings, unless otherwise indicated, like reference numerals in the drawings may represent like elements. The embodiments described in the exemplary embodiments are not intended to be all embodiments consistent with the present disclosure. On the contrary, they are merely examples of devices and methods consistent with some aspects of the present disclosure as detailed in the appended claims.

The terms used in the present disclosure are merely for the purposes of describing specific embodiments, not intended to be limiting. As used in the disclosure and the appended claims, the singular form "a," "an," and "the" as used in the present disclosure and the appended claims include plural forms, unless the context clearly indicates otherwise.

It should be understood that "first," "second," and similar words used in the present disclosure and the claims are not used to represent any order, number, or importance, but only to distinguish different components. Similarly, words such as "a," "an," etc., do not represent a number limit, but represent that there is at least one. Unless otherwise indicated, words such as "front," "rear," "lower," and/or "upper," etc., are provided merely for illustration, not intended to be limited to a position or a spatial direction. Words such as "include," "comprise," etc., may indicate that elements or objects before "include" or "comprise" cover elements, objects, and their equivalents listed after "include" or "comprise," and do not exclude other elements or objects.

Embodiments of the present disclosure may be applied to a process for ceramic shell making in a lost-wax investment casting. The process for ceramic shell making may include coating slurry, sanding, and drying in sequence. The above operation (e.g., coating, sanding, and drying) may be repeated for a module. More descriptions regarding the module(s) and the process may be found elsewhere in the present disclosure. It should be understood that the application scenarios of the production line and the method for ceramic shell making in the present disclosure are merely some examples or embodiments. For those skilled in the art, the present disclosure may be applied to other similar scenarios according to the drawings without creative labor.

FIG. 1 is a block diagram illustrating a system of a production line for ceramic shell making according to some embodiments of the present disclosure.

The system 10 for ceramic shell making may be configured to perform a process for ceramic shell making. The system 10 for ceramic shell making may include a conveyance module 11, a control module 12, an operation module 13, and an inspection module 14.

The conveyance module 11 may be configured to convey an object to be processed to a plurality of stations (e.g., one or more positions in the operation module 13 for processing and making the object) on the production line to perform a corresponding operation. In some embodiments, a portion of the conveyance module 11 may move at a designated speed or pause in response to a control instruction from the control module 12. A portion of the conveyance module 11 may move at a constant speed or a non-uniform speed. In some embodiments, in order to improve the efficiency of the system a portion of the conveyance module 11 may move at the constant speed. In some embodiments, in order to coordinate various operations on the production line, a portion of the conveyance module 11 may move at a non-uniform speed. In some embodiments, the conveyance module 11 may be configured to convey a batch of objects to be processed. For example, at least 20 modules may be conveyed in a same batch. As another example, at least 50 modules may be conveyed in the same batch. As a further example, at least 100 modules may be conveyed in the same batch. As still another example, at least 1000 modules may be conveyed in the same batch. In some embodiments, one conveyance point in the conveyance module 11 may be used to convey at least two modules simultaneously. As another example, one conveyance point in the conveyance module 11 may be used to convey at least three modules, simultaneously. As a further example, one conveyance point in the conveyance module 11 may be used to convey at least four modules, simultaneously.

The conveyance module 11 may include a conveyor chain system 110. In some embodiments, the conveyor chain system 110 may include a chain or belt distributed along the production line. Merely by way of example, the conveyor chain system 110 may include a rail disposed on the floor, in collaboration with a carrier including a motion structure such that the conveyor chain system 110 may convey an object to be processed on the carrier to a designated station on the production line. As another example, the conveyor chain system 110 may include a frame and a conveyance chain disposed on the frame. The conveyance chain may move, driven by a motor, to convey an object to be processed that is hanged on the conveyance chain to a designated station on the production line. As a further example, the conveyor chain system 110 may include a support table and a conveyance belt disposed on the support table. The conveyance belt may move to convey the object to be processed that is placed on the conveyance belt to a designated station. As still another example, the conveyor chain system 110 may include a carrier including a powered motion mechanism, such as an electric cart. A motion path of the electric cart may be predetermined, so that the electric cart may move to convey the object to be processed that is placed on the electric cart to a designated station.

The control module 12 may be operably connected with other modules of the system 10 to receive a status signal or an inspection signal of the other modules, and output the control instruction to the other modules to control the operation of the other modules. For example, the control module 12 may cause the other modules to operate in an orderly manner according to a certain timing, so that each module may coordinate with each other for an automated production.

In some embodiments, the control module 12 may include a single server or a server group. The server group may be centralized or distributed. For example, the control module 12 may include a distributed server group. In some embodiments, the control module 12 may be local or remote. For example, the control module 12 may access information and/or data from the conveyance module 11, the operation module 13, or the inspection module 14 via a network. In some embodiments, the control module 12 may be implemented on a cloud platform. For example, the cloud platform may include a private cloud, a public cloud, a hybrid cloud, a community cloud, a distributed cloud, an inter-cloud, or the like, or a combination thereof. In some embodiments, the control module 12 may include one or more sub-processing devices (e.g., a single-core processor or a multi-core processor). Merely by way of example, the control module 12 may include a central processing unit (CPU), a dedicated integrated circuit (ASIC), a dedicated instruction processor (ASIP), a graphics processing unit (GPU), a physical processing unit (PPU), a digital signal processor (DSP), a field programmable gate array (FPGA), a programmable logic device (PLD), a controller, a micro-controller, a reduced instruction set computer (RISC), a microprocessor, or the like, or any combination thereof.

The operation module 13 may be configured to perform a specific processing and making process. In some embodiments, the operation module 13 may include a plurality of types of processing and making devices. The devices may be disposed upstream or downstream of the production line based on a processing and making sequence of the production process. In some embodiments, the devices may include a robotic arm, a slurry coating device, a sanding device, a drying device, or the like, or any combination thereof. The robotic arm may be configured to remove and replace one or more modules among the batch of modules relative to the conveyor chain system and hold the one or more modules during the slurry coating operation and the sanding operation. The robotic arm may be configured to be moveable to a plurality of positions each of which corresponds to one of a plurality of stations. The slurry coating device may be configured to coat the one or more modules in slurry. The sanding device may be configured to sand the one or more modules. The drying device may be configured to dry the one or more modules.

The inspection module 14 may be configured to acquire and inspect operation data and/or information of the operation of other modules in the system 10 to provide relevant data and/or information to the control module 12. In some embodiments, the inspection module 14 may include one or more sensors. In some embodiments, exemplary sensors may include a speed sensor, an acceleration sensor, a displacement sensor, a pedaling force sensor, a torque sensor, a pressure sensor, a battery temperature sensor, a humidity sensor, or the like, or any combination thereof. In some embodiments, the inspection module 14 may be also configured to determine positioning information (e.g., positioning information of the electric cart in the conveyance module 11, etc.) of a module associated with the system 10 based on a positioning technique. In some embodiments, exemplary positioning techniques may be based on a Global Positioning System (GPS), a Global Navigation Satellite System (GLONASS), a Guide Navigation System (COMPASS), a Beidou Navigation Satellite System, a Galileo Positioning System, a Quasi-Top Satellite System (QZSS), etc.

Figure 2:
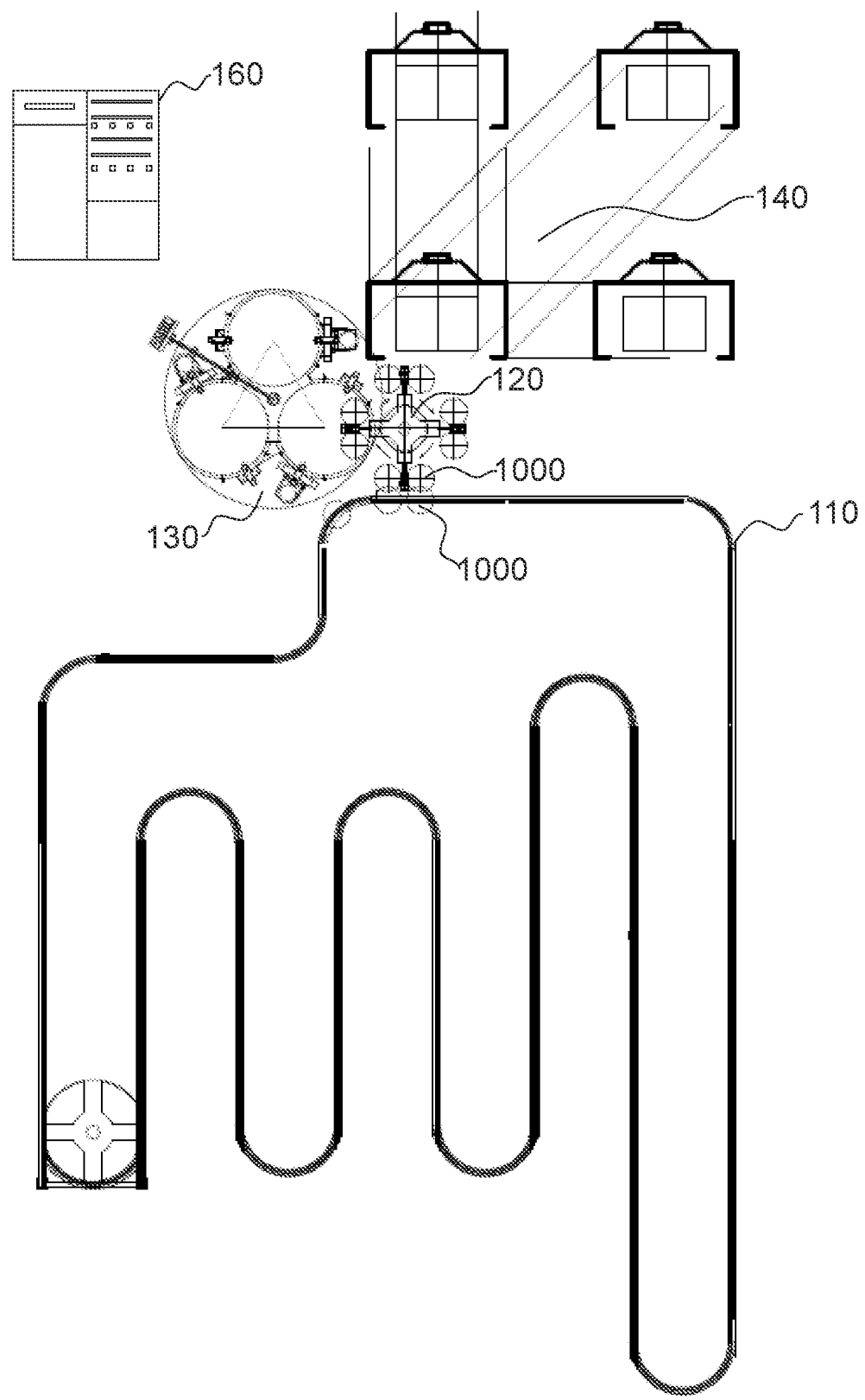
FIG. 2 is a schematic diagram illustrating a production line for ceramic shell making according to some embodiments of the present disclosure.

FIG. 2 is a schematic diagram illustrating a production line for ceramic shell making according to some embodiments of the present disclosure. It may be understood that a structure of the production line shown in FIG. 2 is an implementation of the system 10 shown in FIG. 1 in a production scenario.

As shown in FIG. 2, the production line 100 for ceramic shell making may include a conveyor chain system 110, a robotic arm 120, a slurry coating device 130, a sanding device 140, and a control center 160. Each device in the production line 100 for ceramic shell making may be described in detail below in combination with the embodiment of the production line for ceramic shell making in FIG. 2.

Conveyor Chain System

In some embodiments, the conveyor chain system 110 may be configured to convey a batch of modules (e.g., the module 1000 in FIG. 1). As used herein, at least a portion of the module may be obtained by assembling a plurality of wax patterns through a welding connection. In some embodiments, the conveyor chain system 110 may convey the module in a combination of parallel conveyance and serial conveyance. The parallel conveyance may be understood as a conveyance that the conveyor chain system may convey a plurality of modules at one position on the conveyance line, or a hanger may hang at least two modules. The serial conveyance may be understood as a conveyance that a plurality of hangers configured to hang the module may be disposed at a plurality of positions on the conveyance line of the conveyor chain system so as to continuously convey a batch of modules. In some embodiments, at least two modules may be conveyed in the parallel conveyance. In some embodiments, at least three modules may be conveyed in the parallel conveyance. In some embodiments, at least four modules may be conveyed in the parallel conveyance. In some embodiments, at least two modules conveyed in the parallel conveyance may be the same or different. As used herein, the same or different may be understood as a comparison of at least two modules in terms of a shape or making process. In some embodiments, the making process may be understood as one or more operations including coating the module in slurry, raining sand to the module, drying the module, etc. In some embodiments, a count (number) of modules that can be conveyed in the serial conveyance may be at least one hundred modules. In some embodiments, the count (number) of modules that can be conveyed in the serial conveyance may be at least five hundred modules. In some embodiments, a count (number) of modules that can be conveyed in the serial conveyance may be at least one thousand modules. In some embodiments, the modules may be conveyed by the conveyor chain system 110 at a constant speed or a non-uniform speed. In some embodiments, the modules may be conveyed by the conveyor chain system 110 at the constant speed so as to improve the efficiency of the system 10 and a degree of collaboration between the conveyor chain system 110 and other operations. In some embodiments, a conveyance speed of the conveyor chain system 110 may be adjustable to better cooperate with a subsequent operation.

In some embodiments, a time spent in each operation may be different from the time spent in other operations. For example, a time required for the drying process may be longer than a time required for the operation for slurry coating and the operation for sanding. In order to maintain the pace of the entire production line consistent, the conveyance speed of the conveyor chain system 110 may be adjusted according to the drying process. When the drying process is completed, an instruction may be sent to the conveyor chain system 110, causing the conveyor chain system 110 to continue to convey the module or increase the conveyance speed. When the drying process has not been completed or the drying process needs to be completed, a waiting instruction or an instruction including a waiting time may be sent to the conveyor chain system 110. The "waiting" herein may be understood as pausing or stopping the operation of the conveyor chain system 110. In some embodiments, when the time of the drying process does not require the conveyor chain system 110 to wait or decelerate due to a count (number) of pieces to be dried (e.g., the modules) and/or a drying speed of the drying device, the conveyance speed of the conveyor chain system 110 may also maintain constant.

In some embodiments, the instruction sent to the conveyor chain system 110 may be performed manually. That is, an operator may observe a drying effect, and send instructions of accelerating or waiting according to a drying result. In some embodiments, the drying effect may also be automatically inspected by an inspection device (e.g., the inspection module 14). The inspected drying result may be transmitted to the control center 160. The control center 160 may send, according to the drying result, the instruction to a controller of the conveyor chain system 110 to control a motion state of the conveyor chain system 110. In some embodiments, the drying effect may be determined by inspecting a humidity of a dried piece (e.g., the module). In some embodiments, the control center may estimate a completion time of the drying according to a humidity value inspected by the inspection device and a current drying environment.

In some embodiments, the conveyor chain system 110 may also adopt a stepwise conveyance. For example, the conveyor chain system 110 may move at a constant speed for a period of time and wait for a period of time, and then move at a constant speed for a period of time and wait for a period of time. That is, the conveyor chain system 110 may convey the modules according to a mode that the conveyor chain system 110 moves and pauses alternately. In some embodiments, when a first operation on the production line is performed, since the drying process is located after the slurry coating and the sanding, the conveyor chain system 110 may be moved at a constant speed for a period of time at the beginning. A batch of modules to be performed the drying process may be generated after a period of time. At this time, the conveyor chain system 110 may be paused or stopped for waiting. Awaiting time may be determined according to the completion time of the drying process. When the batch of modules are dried or substantially dried, the conveyor chain system 110 may continue to operate (e.g., move). Another batch of modules may be conveyed to be coated in slurry and rained with sand. When the other batch of modules are about to be dried, the conveyor chain system 110 may be caused to pause again. In some embodiments, the drying device may include one or more fans disposed adjacent to the conveyance line. A position layout of the plurality of fans may be set along a motion direction of the conveyance line. In such embodiments, an effect of the stepwise conveyance may be particularly prominent.

In some embodiments, the conveyor chain system 110 may include a conveyance chain and a plurality of suspension portions connected to the conveyance chain. The suspension portion may be configured to hang the module. The conveyance chain may be configured to drive the module to move to a designated operation position (e.g., a station). In some embodiments, the conveyance chain may include more than one bending portion to convey more modules in a certain space. In some embodiments, the conveyance chain and the suspension portion may be connected via a hanging ring. The hanging ring may be passed through a first through hole disposed in the conveyance chain and a second through hole disposed on the suspension portion. In some embodiments, the suspension portion may be disposed with a replacing portion for replacing the module. In some embodiments, the module may be disposed with a fixing portion that can cooperate with the replacing portion of the suspension portion. In some embodiments, the replacing portion may include a replacing groove. An inner size of the replacing groove may be cooperated with an outer size of the fixing portion of the module to fix the module. In some embodiments, the fixing portion may be cross-shaped. An outer size of a lateral portion of the fixing portion may be cooperated with the inner size of the replacing groove to fix the module.

Control Center

In some embodiments, in order to automatically control the production line, the production line 100 for ceramic shell making may also include the control center 160. In some embodiments, the control center 160 may be operably connected with the conveyor chain system 110 and the robotic arm 120, respectively, to cause, based on a first instruction, the conveyor chain system 110 and the robotic arm 120 to cooperate with each other. In some embodiments, the first instruction may be understood as a program control encoding that is pre-stored in a memory of the control center 160. In some embodiments, the control center 160 may be configured to accurately control a cooperation between the motion of the robotic arm 120 and the motion of the conveyor chain system 110 so as to cause the robotic arm 120 to obtain a module from the conveyor chain system 110 or hang a module to the conveyor chain system 110 at a specific time and at a specific position. For example, the control center 160 may control time intervals of moving and pausing the conveyor chain system 110, and cause the robotic arm 120 to move to a corresponding station to remove and replace the module during the time interval of pausing the conveyor chain system 110 based on the first instruction. The time intervals of moving and pausing the conveyor chain system 110 may be calculated based on each time that the robotic arm 120 spends at a corresponding station. The time that the robotic arm 120 spends at the corresponding station may be obtained according to actual measurement and statistics.

In some embodiments, the slurry coating device 130 and the sanding device 140 may not be controlled by the control center 160. That is, the slurry coating device 130 and the sanding device 140 may not be operably connected with the control center 160. In some embodiments, when the robotic arm 120 clamps a module to rotate to a designated station, the module may be coated or sanded manually. Alternatively, the corresponding operations may be performed by manually controlling the slurry coating device 130 and the sanding device 140. In some embodiments, the operation for slurry coating and the operation for sanding may be performed by manually operating related devices.

In some embodiments, the control center 160 may also be operably connected with the slurry coating device 130 and the sanding device 140 to cause, based on an instruction, the conveyor chain system 110, the robotic arm 120, the slurry coating device 130, and the sanding device 140 to cooperate with each other to automatically control the entire production line.

In some embodiments, the control center 160 may also be operably connected with one of the slurry coating device 130 and the sanding device 140 to cause the conveyor chain system 110, the robotic arm 120, and one of the slurry coating device 130 and the sanding device 140 to cooperate with each other.

In some embodiments, the control center 160 may include a programmable logic controller (PLC). A control manner may include a PLC. The control center 160 may control other components in the production line 100 for ceramic shell making. In some embodiments, the control center 160 may control the conveyor chain system 110 to start or pause. Alternatively, the control center 160 may control the conveyance speed of the conveyor chain system 110. In some embodiments, the control center 160 may also control an operation of the robotic arm 120. The operation may include a movement and rotation of each operation portion of the robotic arm 120. For example, the control center 160 may cause a waist structure of the robotic arm 120 to rotate at an angle. As another example, the control center 160 may cause an arm structure of the robotic arm 120 to move up and down. As a further example, the control center 160 may cause a hand structure of the robotic arm 120 to rotate. In some embodiments, the control center 160 may also control an operation of the slurry coating device 130. For example, the control center 160 may cause the slurry coating device 130 to shift a slurry tank. In some embodiments, the control center 160 may also control an operation of the sanding device 140. For example, the control center 160 may cause the sanding device 140 to shift a sanding machine.

Robotic Arm

In some embodiments, the robotic arm 120 may be configured to hold one or more modules to perform the processing on the one or more modules at a plurality of stations. The robotic arm 120 may be understood as a complex system with high precision, multiple inputs and multiple outputs, highly nonlinear, and strong coupling. In some embodiments, the robotic arm 120 may include a plurality of operation directions. Each of the operation directions may include a plurality of arm structures and a plurality of hand structures. In some embodiments, the robotic arm 120 may include more than two movable connection portions and a driving portion for driving the movable connection portions to move. Each of the movable connection portions may include one or more motion directions so that the robotic arm 120 may include the plurality of operation directions. For example, the robotic arm 120 may further include a rotatable body (also referred to as the waist structure). One or more arm structures may be disposed on the rotatable body. One or more hand structures may be disposed on each of the one or more arm structures. The structures may be connected via the movable connection portions. The robotic arm 120 may be configured to perform one or more operation actions of the production line 100 for ceramic shell making. Each operation direction of the robotic arm 120 may correspond to a station of the production line 100 for ceramic shell making. The station may include at least a removing and replacing station, a first station, and a second station. The removing and replacing station refers to a station for removing and replacing one or more modules relative to the conveyor chain system 110. The first station refers to a station that coats the module in slurry. The second station may be a station that rains sand to the module. In some embodiments, the station may further include an auxiliary station. The auxiliary station may be configured to perform an auxiliary function, such as, a pretreatment on the module before slurry coating. In some embodiments, the removing and replacing station may be a same station or two different stations. In some embodiments, the robotic arm 120 may include four stations. For example, the four stations of the robotic arm 120 may include a module removing station, a module replacing station, a slurry coating station, and a sanding station. As another example, the four stations of the robotic arm 120 may also include a removing and replacing station, a first slurry coating station, a second slurry coating position, and a sanding station. As a further example, the four stations of the robotic arm 120 may also include a removing and replacing station, a slurry coating station, a first sanding position, and a second sanding station. In some embodiments, the robotic arm 120 may include three stations. For example, the three stations of the robotic arm 120 may include a removing and replacing station, a slurry coating station, and a sanding station. In some embodiments, the robotic arm 120 may include more stations. The other stations of the robotic arm 120 may be combined and arranged according to the above operations. For example, the operation of removing the module and hanging the module may be arranged to one station or two stations. Multiple layers of slurry may be coated on a same station or different stations. Multiple layers of sand may be rained on a same station or different stations. For instance, the stations may be arranged according to a count (number) of stations and an order of operations. For example, the operations with similar operation sequences may be arranged on adjacent stations.

In some embodiments, the robotic arm 120 may operate a module at any one station. Alternatively, two or more modules may be operated simultaneously to increase the production efficiency. When the robotic arm 120 operates more than one module simultaneously, the suspension portion of the conveyor chain system 110 may include a corresponding count (number) of sub-suspension portions. As used herein, each sub-suspension portion may be configured to hang a module.

In some embodiments, two modules may be simultaneously operated at one station. The robotic arm 120 may include a structure with three directions and six arms. The structure with three directions and six arms may include three sets of robotic arms distributed around three different directions. Each set of robotic arms along each direction may correspond to one station. The station may be transferred through a rotation of the set of robotic arms. Each set of robotic arms may include two robotic arms. Each robotic arm may be configured to operate a module. In some embodiments, the "three directions" of the "the structure with three directions and six arms" may be understood as three stations, such as the removing and replacing station, the slurry coating station, and the sanding station. Each station in the three stations may also include two robotic arms corresponding to two modules. A sum of robotic arms of the three stations refers to the "six arms."

In some embodiments, two modules may be simultaneously operated at one station. The robotic arm 120 may include a structure with four directions and eight arms. The structure with four directions and eight arms may include four sets of robotic arms distributed around four different directions. Each set of robotic arms along each direction may correspond to one station. The station may be transferred through a rotation of the set of robotic arms. Each set of robotic arms may include two robotic arms. Each robotic arm may be configured to operate a module. Accordingly, the "four directions" of the "the structure with four directions and eight arms" may be understood as four stations, such as the removing and replacing station, the slurry coating station, the sanding station, and the auxiliary station (e.g., the pretreatment station before slurry coating) as described above. Each station in the four stations may also include two robotic arms, which are formed the "eight arms." In some embodiments, the robotic arm 120 may further include a structure with three directions and nine arms, a structure with four directions and twelve arms. That is, each station may correspond to three robotic arms that may clamp three modules simultaneously. In some embodiments, the robotic arm 120 may include five stations, six stations, and more stations. In some embodiments, each station may be configured to operate two modules, three modules, four modules, and more modules, simultaneously. A count (number) of modules may correspond to a count (number) of robotic arms in each station. Correspondingly, in different embodiments, the robotic arm 120 may also include a structure with five directions and ten arms, a structure with five directions and fifteen arms, a structure with five directions and twenty arms, etc. Alternatively, the robotic arm 120 may further include a structure with six directions and twelve arms, a structure with six directions and eighteen arms, a structure with six directions and twenty-four arms, etc. A count (number) of "direction" may correspond to a count (number) of stations of the robotic arm 120. A count (number) of "arm" may correspond to a sum of the count (number) of modules operated on all stations. According to the above manner, the robotic arm 120 may also include more forms, which may not be repeated.

In some embodiments, the count (number) of robotic arms on each station of the robotic arm 120 may be the same or different. In order to achieve consistency of operation, the count (number) of robotic arms at each station may be the same. In some embodiments, structures of at least two robotic arms at a same station of the robotic arm 120 may be the same or different. In some embodiments, structures of robotic arms between at least two stations may be the same or different.

In some embodiments, the robotic arm 120 may be moved with a plurality of degrees of freedom. The robotic arm 120 with the plurality of degrees of freedom may be moved by the waist structure, the arm structure, and the hand structure of the robotic arm 120 under the driving of the driving portion.

In some embodiments, in order to save space, the robotic arm 120 may also include one robotic arm. The robotic arm may be rotated between different operation stations to perform the corresponding operation. A structure of the robotic arm may include the structure of the robotic arm described above. In some embodiments, the robotic arm may also include other structures of robotic arms to obtain more degrees of freedom. For example, the robotic arm may include a rotation portion of a glenohumeral joint, a rotation portion of an elbow joint, a rotation portion of a wrist joint, an upper arm connecting the rotation portion of the glenohumeral joint and the rotation portion of the elbow joint, a forearm connecting the rotation portion of the wrist joint and the rotation portion of the elbow joint, a hand portion connected with the rotation portion of the wrist joint. The plurality of rotation portions of joints and a relative position between the upper arm and the forearm may be adjusted to cause the hand portion to move between the plurality of operation stations. For example, the structure of the robotic arm may further include a rotation seat capable of rotating the entire robotic arm to cause the robotic arm to move to more operation positions. In addition, since a rotation angle of the rotation seat is relatively easy to be controlled, a position movement of the robotic arm may be caused to obtain a higher accuracy.

The robotic arm 120 in the present disclosure may also include other types or structures of robotic arms as long as the robotic arm can clamp an object and can be used to move the object to the designated position.

Figure 3:
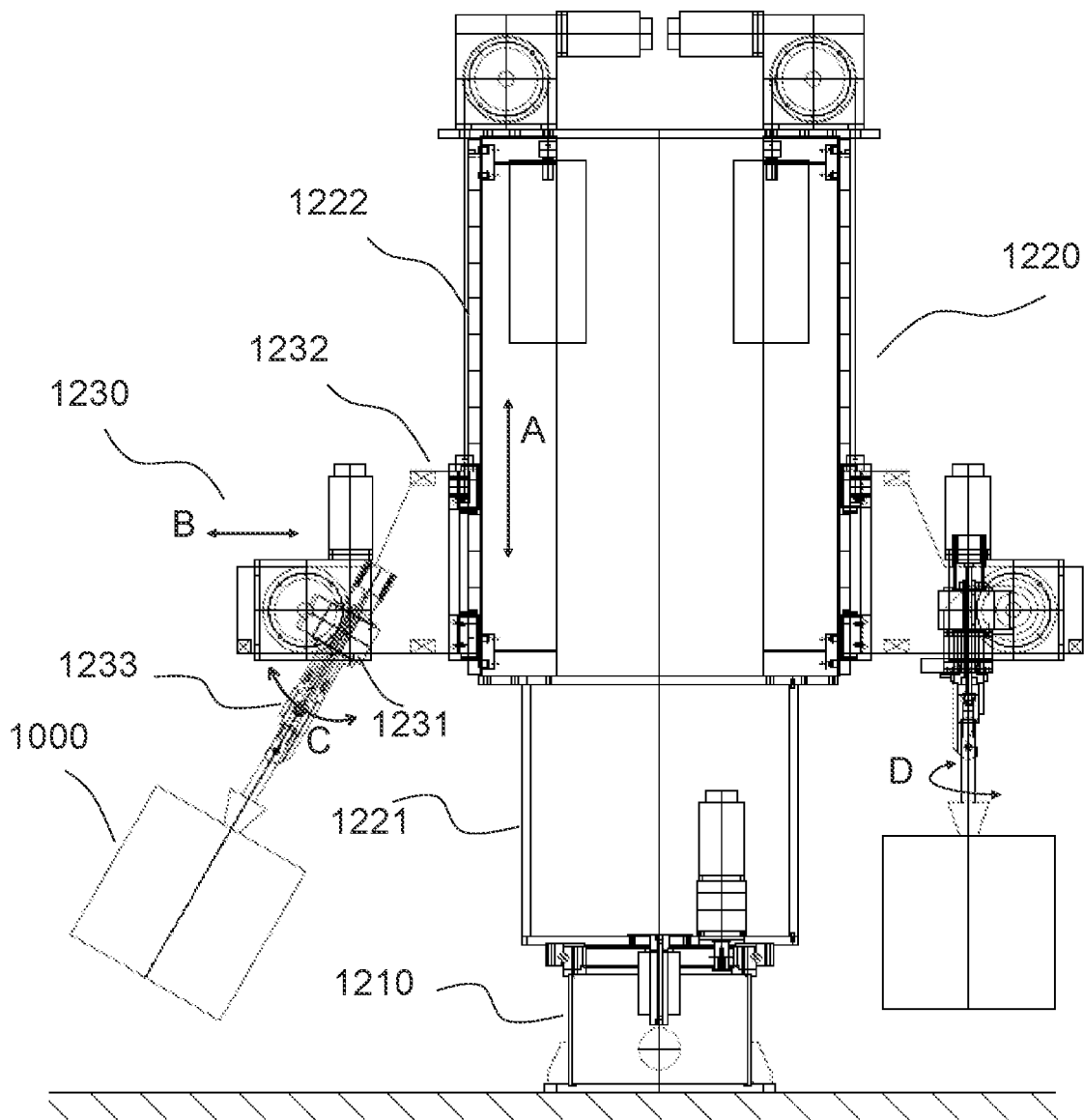
FIG. 3 is a schematic diagram illustrating a robotic arm according to some embodiments of the present disclosure.
Figure 4:
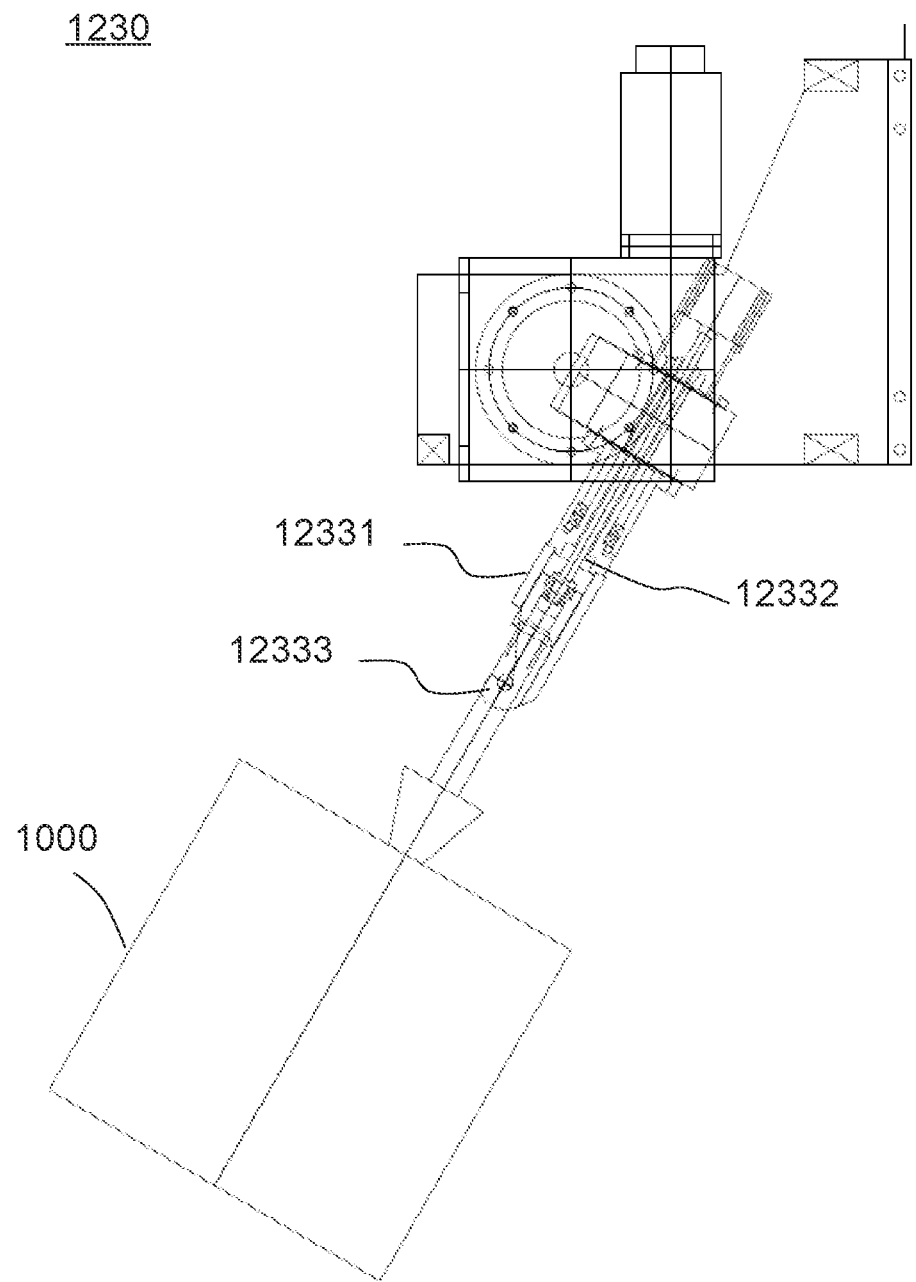
FIG. 4 is a schematic diagram illustrating the robotic arm in FIG. 3.

FIG. 3 is a schematic diagram illustrating a robotic arm 120 according to some embodiments of the present disclosure. FIG. 4 is a schematic diagram illustrating the robotic arm 120 in FIG. 3.

In some embodiments, the robotic arm 120 may include a base 1210 and a main body 1220 that is rotatable relative to the base 1210. A plurality of robotic arms 1230 may be arranged on the main body 1220. A rotation of the main body 1220 relative to the base 1210 may cause a rotation transfer of the plurality of robotic arms 1230 at different stations. The main body 1220 may include a rotation and connection portion 1221 opposite to the base 1210. The rotation and connection portion 1221 may be understood as the waist structure. In some embodiments, the robotic arm may include at least a swing arm 1231. The swing arm 1231 may be capable of swinging in one or more planes relative to the main body 1220. For example, the swing arm 1231 may be swung in one or more planes parallel to an axis of the main body 1220. As another example, the swing arm 1231 may be swung in one or more planes perpendicular to an axis of the main body 1220. As a further example, the swing arm 1231 may be swung in any plane that intersects the axis of the main body 1220. In some embodiments, the swing arm 1231 may swing along a direction C in FIG. 3. An angle range of the swing may be from 0 degrees to 360 degrees. In some embodiments, the angle range of the swing may be from 0 degrees to 330 degrees. In some embodiments, the angle range of the swing may be from 0 degrees to 300 degrees. In some embodiments, the angle range of the swing may be from 0 degrees to 270 degrees. In some embodiments, the angle range of the swing may be from 0 degrees to 240 degrees. In some embodiments, the angle range of the swing may be from 0 degrees to 210 degrees. In some embodiments, the angle range of the swing may be from 0 degrees to 180 degrees. In some embodiments, the angle range of the swing may be from 0 degrees to 150 degrees. In some embodiments, the angle range of the swing may be from 0 degrees to 120 degrees. In some embodiments, the angle range of the swing may be from 0 degrees to 90 degrees.

In some embodiments, the robotic arm may also include a lifting arm 1232. The lifting arm 1232 may be movably disposed relative to the main body 1220 along the axial direction of the main body 1220. For instance, the lifting arm 1232 may be moved up-and-down along a direction A in FIG. 3 relative to the main body 1220. In some embodiments, the lifting arm 1232 may be movably connected with the main body 1220 via a motion rail 1222 disposed on the main body 1220. In some embodiments, the swing arm 1231 may be connected with the main body 1220 via the lifting arm 1232. The swing arm 1231 may be rotatably connected with the lifting arm 1232 so as to cause the swing arm 1231 to move up-and-down relative to the main body 1220 and rotate relative to the main body 1220.

In some embodiments, the robotic arm 1230 may further include an extension arm (not shown in FIG. 3). The extension arm may be disposed on the swing arm 1231. For example, the extension arm may be fixedly disposed relative to the lifting arm 1232, and extended outward relative to a center of the main body 1220. In some embodiments, the extension arm may be extended outward along a horizontal direction. In some embodiments, the extension arm may be disposed between the lifting arm 1232 and the swing arm 1231. The swing arm 1231 may be rotatably disposed on the extension arm and moved back and forth along an extension direction of the extension arm (indicated a direction B as shown in FIG. 3). Therefore, a horizontal distance between the swing arm 1231 and the main body 1220 may be adjusted.

In some embodiments, an arm structure of the robotic arm may include the arm portion and the rotation and connection portion 1221 that can cause the arm portion to rotate. The arm portion may include the swing arm 1231, the lifting arm 1232, the extension arm, or the like, or any combination thereof.

In some embodiments, the hand structure 1233 of the robotic arm may be connected with the arm structure for clamping the module 1000. In some embodiments, the hand structure 1233 may include a hand portion 12331, a connection structure 12332 for connecting the hand structure 1233 and the arm portion, and a finger structure 12333 for clamping the module 1000. In some embodiments, a connection of the hand portion and the arm portion may include a fixed connection or a relatively rotatable connection. In some embodiments, the hand portion may be rotatably connected with the arm portion. In some embodiments, the rotatable connection may include two types of rotatable connection. One type of rotatable connection refers to that the hand portion may be rotated relative to an axis of the hand portion (e.g., a direction D shown in FIG. 3). That is, the hand portion may be rotated. The other type of rotatable connection refers to that the hand portion may be rotated relative to a connection shaft between the hand portion and the arm portion. In some embodiments, a rotation axis of the rotation of the hand portion may be parallel to or coaxial with a centerline of the arm portion. In some embodiments, when the finger structure clamps the module 1000, a shaped center of the module 1000 may be parallel to or coaxial with the axis of the hand portion and/or the axis of the arm portion.

In some embodiments, the driving portion of the robotic arm 120 may include a waist driver and an arm driver. The waist driver may be configured to drive a waist mechanism to move. The waist driver may be configured to drive the arm portion to move. In some embodiments, the driving portion may further include a hand driver configured to drive the hand portion to move. In some embodiments, the waist driver may include a motor. A rotation of the motor may drive the waist mechanism to move. That is, the main body 1220 may be driven to rotate relative to the base 1210. In some embodiments, the arm driver may include one or more driving motors. The one or more driving motors may be configured to drive the swing of the swing arm 1231 and the motion of the lifting arm 1232 and/or the extension arm, respectively. In some embodiments, the motion of the swing arm 1231, the lifting arm 1232, the extension arm may be driven by one motor or a plurality of motors. For instance, the motion of the swing arm 1231, the lifting arm 1232, the extension arm may be driven by the plurality of motors. For example, the three robotic arms may correspond to different driving motors, respectively. Alternatively, two robotic arms among the three robotic arms may be driven by a same driving motor. In some embodiments, the driver may include a pneumatic driver or an electric drive. When the drive includes an electric drive (i.e., the motor), the driver may include a stepper motor or a servomotor.

In some embodiments, the main body 1220 may be rotated 360 degrees relative to the rotation and connection portion of the base 1210. Therefore, each of the operation directions of the robotic arm 120 may be transferred between the stations in the production line for ceramic shell making. For example, the module may be driven to rotate from a slurry coating station to a sanding station using the robotic arm 120. In some embodiments, the rotation of the 360 degrees may be rotated at a certain angle each time. That is, the rotation of the 360 degrees may be performed through a count (number) of times (e.g., 3 or 4 times). In some embodiments, the module may be moved in a same station by the movement of the arm structure and the hand structure of the robotic arm 120. For example, the arm structure may obliquely or vertically lift the module to a certain height. In some embodiments, the robotic arm 120 may be transferred between different stations through the waist structure. For example, the waist structure may drive the module to rotate from a slurry coating station to a sanding station. In some embodiments, when the finger structure clamps the module, the rotation of the hand structure may drive the module to rotate. For example, when the module is moved downwards to be immersed in the slurry in a slurry tank and the module is lifted from a liquid surface of the slurry, the rotation of the module may realize that the module has been coated the sufficient slurry and the excess slurry on the surface of the module.

Slurry Coating Device

In some embodiments, the slurry coating device 130 may correspond to the first station of the robotic arm 120. The slurry coating device 130 may be configured to provide a corresponding type of slurry and coat the module in the corresponding type of slurry. The slurry coating device 130 may include one or more slurry tanks. The one or more slurry tanks may be accommodated one or more different types of slurry. In some embodiments, when the control center 160 is operably connected with the slurry coating device, the control center 160 may cause, based on a third instruction, the slurry coating device 130 to automatically transfer the slurry tank. In some embodiments, the slurry tank may be transferred manually and separately via a controller of the slurry coating device 130. For example, when the operator finds that the robotic arm 120 has removed the module 1000 from the conveyor chain system so that the module 1000 is about to enter the operation for slurry coating, the operator may transfer a slurry tank including the corresponding type of slurry in the slurry coating device 130 to a first designated position through a corresponding control button to coat the module 1000 in the slurry. The slurry coating device and the transfer structure may be specifically described below in combination with different embodiments and the drawings.

Figure 5:
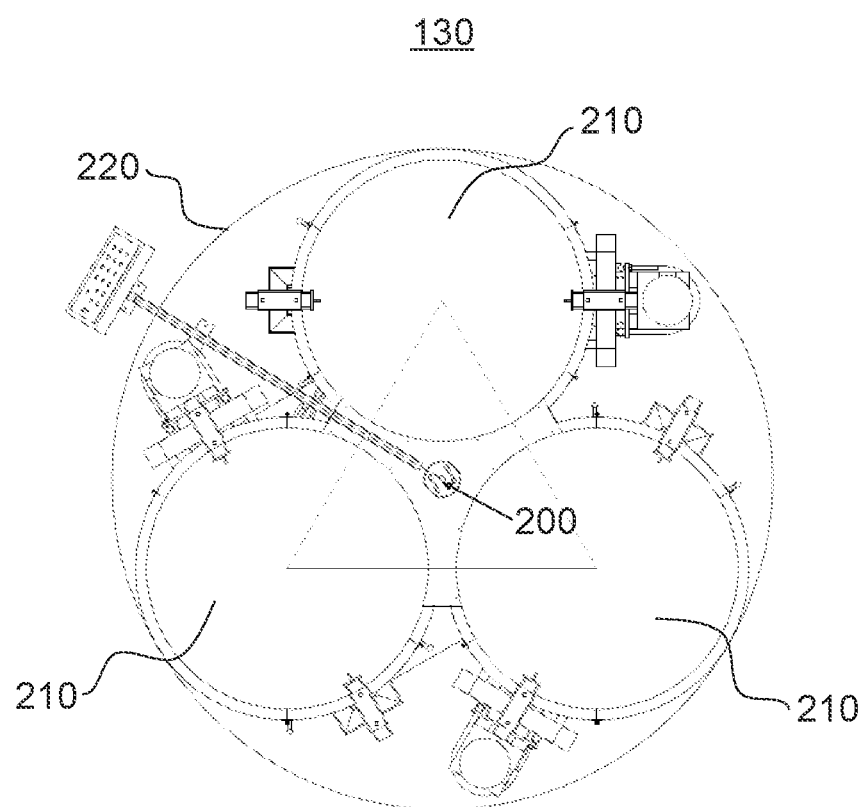
FIG. 5 is a schematic diagram illustrating a slurry coating device according to some embodiments of the present disclosure.

FIG. 5 is a schematic diagram illustrating a slurry coating device 130 according to some embodiments of the present disclosure.

In some embodiments, the slurry coating device 130 may include at least two slurry tanks (e.g., the slurry tanks 210 as shown in FIG. 5) for accommodating the slurry. Each slurry tank may correspond to an operation for slurry coating (also corresponding to a type of slurry). The slurry coating device 130 may be moved, based on a control instruction (also referred to a third instruction), to transfer a slurry tank including a corresponding type of slurry to a first designated position. For example, some modules may be performed three operations for slurry coating corresponding to a surface layer, a second layer, a rear layer of the modules, respectively. Correspondingly, the slurry coating device 130 may include a slurry tank of the surface layer for accommodating a slurry for coating the surface layer, a slurry tank of the second layer for accommodating a slurry for coating the second layer, and a slurry tank of the rear layer for accommodating a slurry for coating the rear layer.

In some embodiments, each slurry tank may be disposed around a central position (e.g., a position 200 in FIG. 5). When an operation for coating a designated type of slurry is performed, each slurry tank may be rotated around the central position so as to rotate the slurry tank accommodating a designated type of slurry to a station corresponding to the operation for slurry coating (also referred to the first designated position). In some embodiments, the slurry coating device 130 may include a carousel 220 configured to rotate in a controlled manner. The carousel 220 may be disposed with the plurality of slurry tanks (e.g., the slurry tanks 210 in FIG. 5). The carousel 220 may be configured to rotate, based on the control instruction, to transfer the slurry tank including the corresponding type of slurry to the station corresponding to the operation for slurry coating.

In some embodiments, the slurry coating device 130 may also include one rotation base disposed for at least one slurry tank. The rotation base may be rotated, based on the control instruction, to drive the slurry tank to rotate. Therefore, the surface of the module may be sufficiently coated in slurry.

In some embodiments, the slurry coating device 130 may be operably connected with the control center 160 to control, based on the control instruction of the control center 160, the movement (e.g., the rotation of the carousel 220 and/or the rotation base) of the slurry coating device 130. In some embodiments, the slurry coating device 130 may also be integrated with a controller to control, based on the control instruction of the controller, the movement (e.g., the rotation of the carousel 220 and/or the rotation base) of the slurry coating device 130.

In some embodiments, the slurry coating device 130 may also be transferred the slurry tank via an online rail transfer device. The online rail transfer device may include a base, a flatbed trolley, a slurry tank, a longitudinal side rail, a longitudinal short rail, a horizontal rail, a longitudinal long rail, and a bottom trolley. The base may include a multi-groove type member buried underground. The longitudinal long rail and the longitudinal short rail may be laid in the middle of the base. A position for mounting the horizontal rail at a connection of the two rails (i.e., the longitudinal long rail and the longitudinal short rail) may be reserved. The longitudinal side rail may be disposed on both sides of the longitudinal short rail. An outer extending end of the longitudinal short rail may be flush with an outer extending end of the longitudinal side rail. An inner extending end of the longitudinal side rail may be stopped at the horizontal rail. A mounting height of the horizontal rail may be lower than mounting heights of all the longitudinal rail (e.g., the longitudinal side rail, the longitudinal short rail, the longitudinal long rail). A height difference between the horizontal rail and the longitudinal rail may be equal to a net height of the bottom trolley. Two bridge rails may be disposed on an upper plane of the bottom trolley. A length of the bridge rail may be equal to a reserved interval between the longitudinal long rail and the longitudinal short rail. The bottom trolley equipped with rollers may be moved along the horizontal rail. The online rail transfer device may be described in detail below with reference to the drawings.

Figure 6:
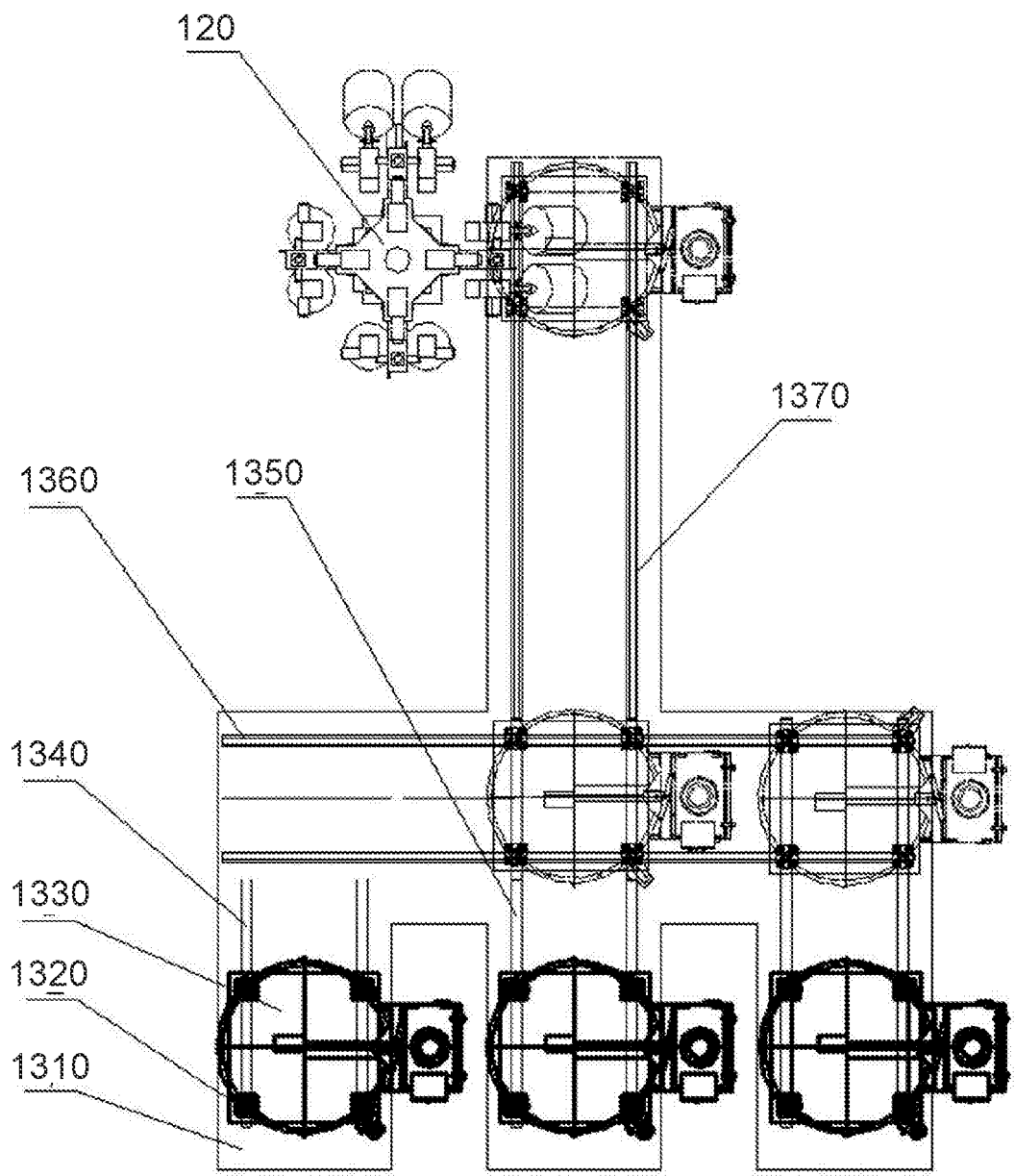
FIG. 6 is a schematic diagram illustrating a slurry coating device and an online rail transfer device thereof according to some embodiments of the present disclosure.
Figure 7:
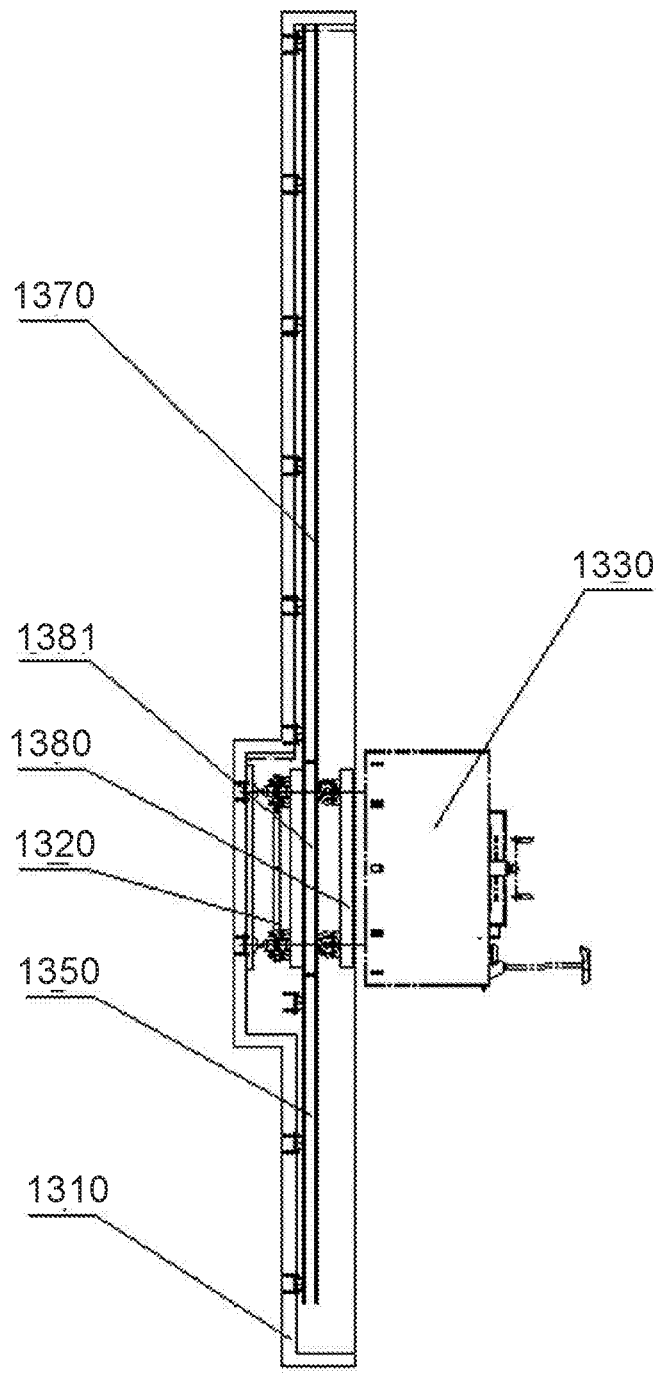
FIG. 7 is a schematic diagram illustrating a side view of the slurry coating device and the online rail transfer device thereof in FIG. 6.
Figure 8:
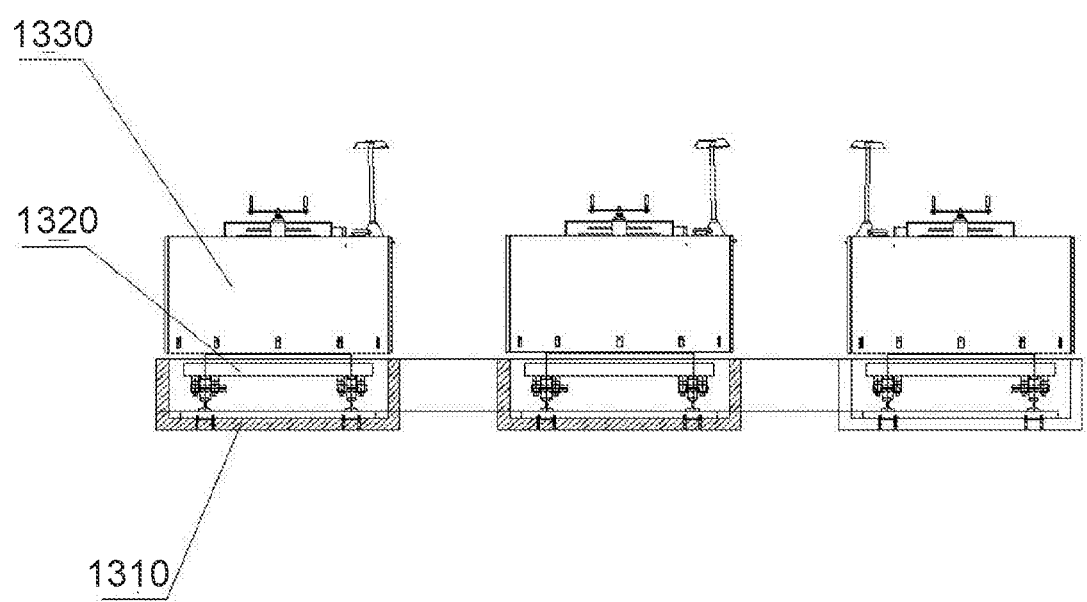
FIG. 8 is a schematic diagram illustrating a top view of the slurry coating device and the online rail transfer device thereof in FIG. 6.

FIG. 6 is a schematic diagram illustrating a slurry coating device 130 and an online rail transfer device thereof according to some embodiments of the present disclosure. FIG. 7 is a schematic diagram illustrating a side view of the slurry coating device and the online rail transfer device thereof in FIG. 6. FIG. 8 is a schematic diagram illustrating a top view of the slurry coating device and the online rail transfer device thereof in FIG. 6.

As shown in FIGS. 6-8, the online rail transfer device may include a base 1310, flatbed trolleys 1320, one or more slurry tanks 1330, a longitudinal side rail 1340, a longitudinal short rail 1350, a horizontal rail 1360, a longitudinal long rail 1370, and a bottom trolley 1380. The flatbed trolleys 1320 and the bottom trolley 1380 may be carriers that realize the rail transfer of the slurry tank 1330. That is, each of the flatbed trolleys 1320 and the bottom trolley 1380 refers to a tool trolley equipped with an electric device to move along a rail. An upper plane of the flatbed trolley 1320 may be a rectangular plate. Four corners of a bottom surface of the flatbed trolley 1320 may be equipped with rollers according to a gauge of the longitudinal long rail 1370, the longitudinal short rail 1350, or the longitudinal side rail 1340. The base 1310 may be a multi-groove type member buried underground. A rail seat with a structure of three longitudinal straight grooves and one horizontal straight groove may be disposed in the base 1310. A centered longitudinal straight groove may be perpendicularly crossed with the horizontal straight groove. A cross-section of each groove may be a rectangular groove with an opening facing upwards. The longitudinal long rail 1370 and the longitudinal short rail 1350 may be laid in the center of the base 1310. A position for mounting the horizontal rail 1360 at a connection of the two rails (i.e., the longitudinal long rail 1370 and the longitudinal short rail 1350) may be reserved. An outer extending end of the longitudinal short rail 1350 may be located at one side of the corresponding robotic arm 120. A barrier-free environment may facilitate each flatbed trolley 1320 loading the corresponding slurry tank 1330 to enter an operation area (e.g., the station) of the robotic arm 120. In order to transfer the rail of the slurry tank 1330 on the plurality of stations online, the longitudinal side rail 1340 may be laid parallel to each other at equal intervals on both sides of the longitudinal short rail 1350. In the embodiment, two longitudinal side rails 1340 may be laid on left and right sides of the longitudinal short rail 1350. In such asymmetrical rail structure, outer extending ends (i.e., start ends) of the longitudinal short rails 1350 and the longitudinal side rails 1340 may be flush with each other. In addition, inner extending ends of the longitudinal side rails 1340 on both sides may be stopped at the horizontal rail 1360 to form a vertically crossing rail structure. In order to facilitate cross-moving, a mounting height of the horizontal rail 1360 may be lower than mounting heights of all longitudinal rails (e.g., the longitudinal side rail 1340, the longitudinal short rail 1350, the longitudinal long rail 1370). A height difference between the horizontal rail 1360 and the longitudinal rail may be equal to a net height of the bottom trolley 1380. The bottom trolley 1380 may be a trolley used to connect and transfer the flatbed trolleys 1320. An upper plane of the bottom trolley 1380 may be fixedly connected with two bridge rails 1381. A specification of the bridge rail 1381 may be the same as a specification of the longitudinal long rail 1370. A length of the bridge rail 1381 may be equal to a reserved interval between the longitudinal long rail 1370 and the longitudinal short rail 1350. The bridge rails 1381 may be arranged longitudinally. Four corners of a bottom surface of the bottom trolley 1380 may be also equipped with rollers. The bottom trolley 1380 may be moved along the horizontal rail 1360.

In the embodiment, three positions may be disposed with the slurry tanks 1330. The middle slurry tank 1330 may be configured to coat slurry on a surface layer of the ceramic shell. The slurry tank 1330 on the left side may be configured to coat slurry on a second layer of the ceramic shell. The slurry tank 1330 on the right side may be configured to coat slurry on a third layer of the ceramic shell. When used, the bottom trolley 1380 may be first driven to a middle section of the horizontal rail 1360. The bridge rail 1381 may be used to fill in the interval between the longitudinal long rail 1370 and the longitudinal short rail 1350 so as to connect the longitudinal long rail 1370 and the longitudinal short rail 1350. The flatbed trolley 1320 located on the longitudinal short rail 1350 may be driven, by an electronic control, to carry the slurry tank 1330 including a slurry for coating the surface layer to a position indicated by the dotted line in FIG. 6 along the longitudinal long rail 1370 after transferred by the bottom trolley 1380. The position may indicate a position at the robotic arm 120 where the surface layer of the ceramic shell is coated in the slurry. After the surface layer of the ceramic shell is coated with the slurry, the flatbed trolley 1320 in the middle may be driven, by the electronic control, to return to an original station for standby. The bottom trolley 1380 may be started, according to a program, to move to a left end of the horizontal rail 1360. The flatbed trolley 1320 on the left may carry the slurry tank 1330 to the bottom trolley 1380. The flatbed trolley 1320 may be moved along with the bottom trolley 1380 to the middle section of the horizontal rail 1360. When the bridge rail 1381 on the bottom trolley 1380 is connected to the interval between the longitudinal long rail 1370 and the longitudinal short rail 1350, the flatbed trolley 1320 may be driven to carry the slurry tank 1330 including a slurry for coating the second layer to the position at the robotic arm 120. The barrier-free environment may facilitate to coat the slurry on the second layer of the ceramic shell. After the second layer of the ceramic shell is coated the slurry, the flatbed trolley 1320 on the left side may be driven, by the electronic control, to return to the original station for standby. Subsequently, a movement sequence of the slurry tank 1330 on the right side may be the same as that of the slurry tank 1330 on the left side, which will not be repeated.

In the embodiment, the slurry tanks 1330 on the plurality of positions may be moved orderly to the hand structure of the robotic arm 120 through the rail transfer. The operation for slurry coating may be performed using the robotic arm 120, which may ensure the quality of the coating slurry, and sufficiently use the robotic arm 120 to continuously homogenize operations. In addition, the operation for slurry coating may be performed intensively. There may be no pollution problem of slurries between adjacent slurry tanks when coating slurry. Therefore, the slurry quality may be stable and reliable. The production efficiency may be high, which is especially suitable for the production line.

Sanding Device

In some embodiments, the sanding device 140 may correspond to the second station of the robotic arm 120. The sanding device 140 may be configured to provide a corresponding type of sand material and rain sand to the module. In some embodiments, the sanding device 140 may include one or more sanding machines for providing one or more different types of sand materials to the module so as to achieve corresponding requirements of sanding. In some embodiments, the sanding device may include a plurality of sanding machines. Each of the plurality of sanding machines may include a type of sand different from that in other sanding machines. In some embodiments, the sanding device may also include one sanding machine. The sanding machine may include different types of sand materials, which may provide a corresponding type of sand material according to the sand raining to the module.

In some embodiments, when the control center 160 is operably connected with the sanding device 140, the sanding device 140 may be caused, based on a second instruction, to transfer sanding machines including different corresponding types of sand materials. In some embodiments, the sanding device 140 may be caused, based on the second instruction, to transfer different types of sand materials in a same sanding machine.

Figure 9:
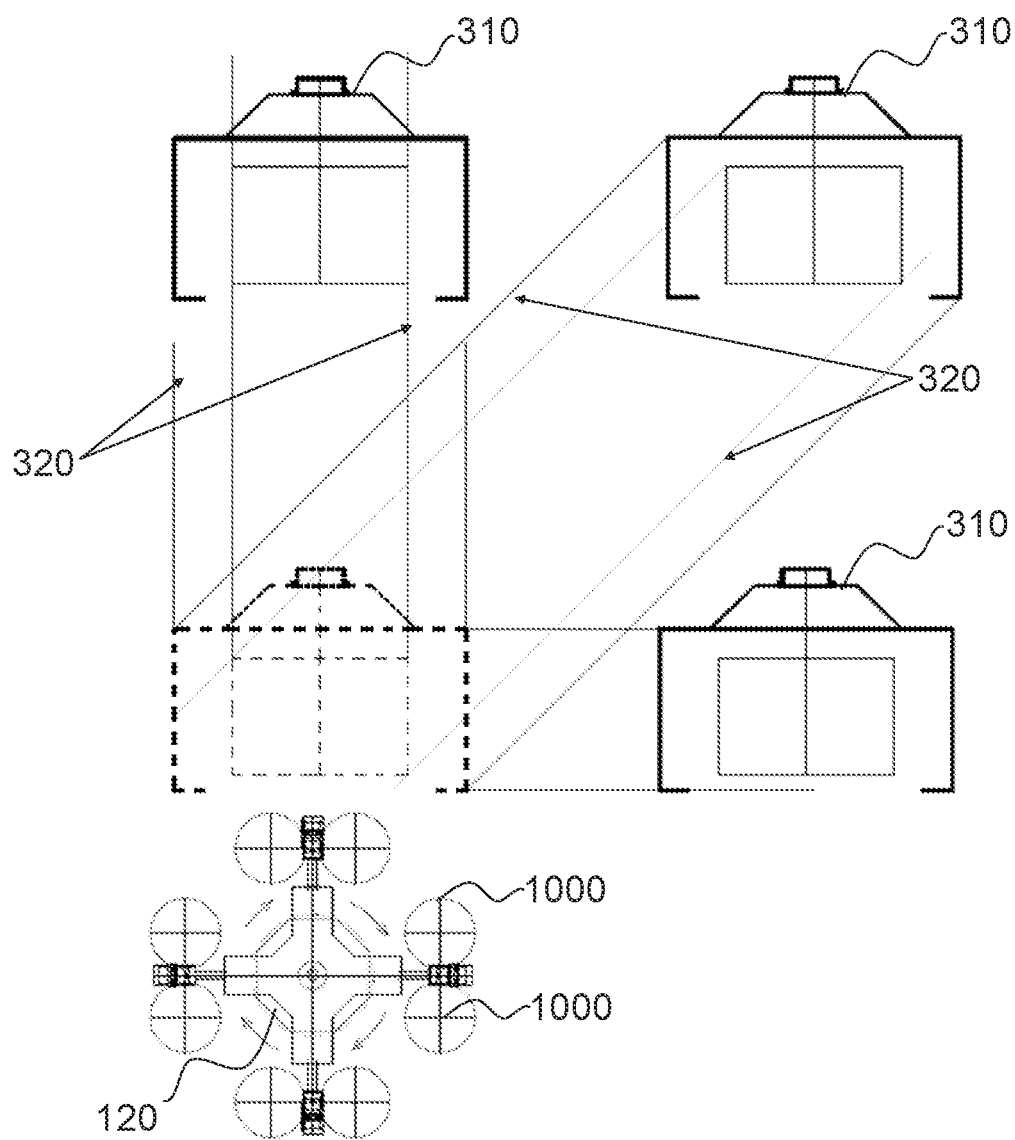
FIG. 9 is a schematic diagram illustrating a sanding device according to some embodiments of the present disclosure.

FIG. 9 is a schematic diagram illustrating a sanding device 140 according to some embodiments of the present disclosure.

In some embodiments, the sanding device 140 may include a plurality of sanding machines (e.g., the sanding machines 310 in FIG. 9) including different types of sand materials. A type of sand material used in each of the plurality of sanding machines may correspond to a type of slurry used in the last operation for coating the module in slurry. The sanding machine including a corresponding type of sand material may be caused, based on a control instruction (also referred to as a second instruction), to transfer to a station corresponding to the operation for sanding (also referred to as a second designated position).

In some embodiments, the sanding device 140 may include a powered motion mechanism 320. The powered motion mechanism 320 may be configured to transfer the sanding machine including the corresponding type of sand to the station corresponding to the operation for sanding. In some embodiments, the powered motion mechanism 320 may include a rail for guiding a movement trajectory of the sanding machine and a motor that provides the power required for the movement of the sanding machine.

In some embodiments, the sanding device 140 may be operably connected with the control center 160 to cause, based on the control instruction, to transfer the sanding machine including the corresponding type of sand to move to the station corresponding to the operation for sanding. For example, the powered motion mechanism 320 may be controlled to drive the sanding machine including the corresponding type of sand to move to the station corresponding to the operation for sanding. In some embodiments, the sanding device 140 may also be integrated with a corresponding controller to control, based on the control instruction of the controller, the sanding machine including the corresponding type of sand to move to the station corresponding to the operation for sanding. For example, the powered motion mechanism 320 may be caused to drive the sanding machine including the corresponding type of sand to move to the station corresponding to the operation for sanding.

In some embodiments, the sanding device 140 may be caused to transfer the sanding machines including the different types of sand materials by disposing a carousel. The specific solution may be referred to the transferring manner of the slurry coating device in FIG. 5. The sanding machines including the different types of sand materials may be placed on a carousel. The carousel may be rotated to transfer the different sanding machines.

More descriptions regarding a structure of the sanding machine may be described in combination with the related drawings of different embodiments.

Figure 10:
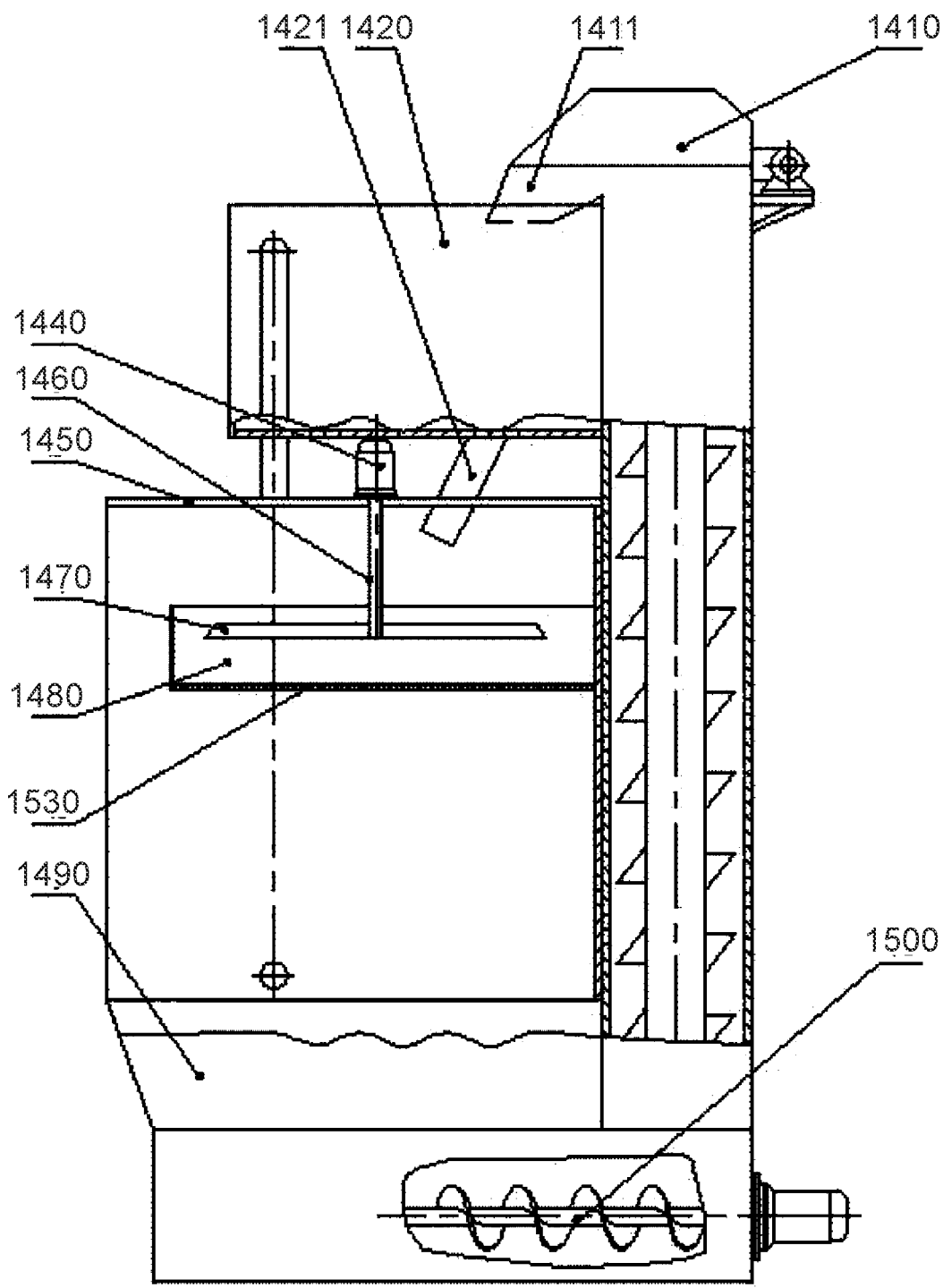
FIG. 10 is a schematic diagram illustrating a sanding device according to some embodiments of the present disclosure.
Figure 11:
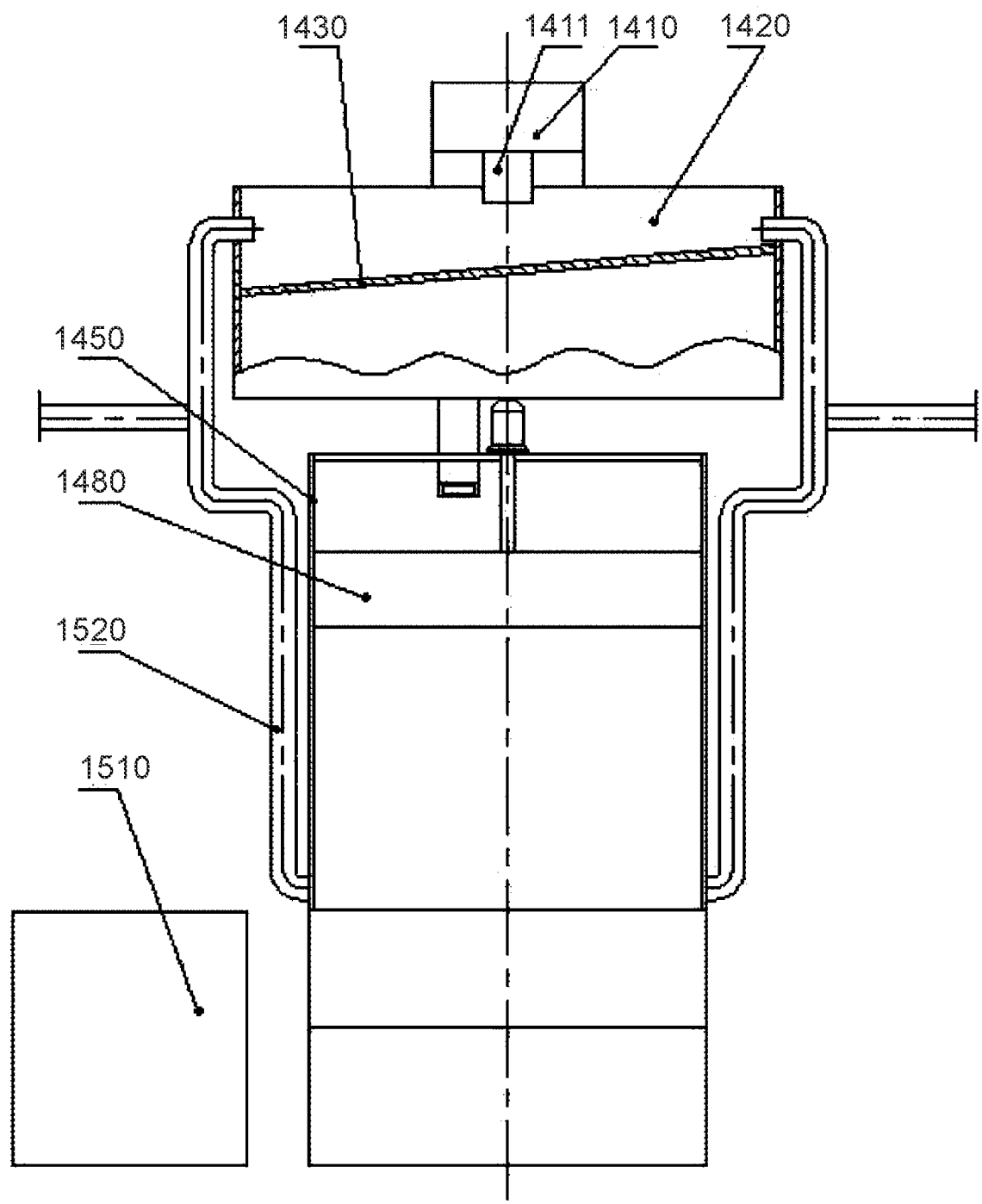
FIG. 11 is a schematic diagram illustrating a left view of the sanding device in FIG. 10.

FIG. 10 is a schematic diagram illustrating a sanding device according to some embodiments of the present disclosure. FIG. 11 is a schematic diagram illustrating a left view of the sanding device in FIG. 10.

The sanding machine may include a bucket elevator 1410, a flask 1420, a motor 1440, a housing 1450, a spindle 1460, a sanding barrel 1480, and a sand hopper 1490.

The bucket elevator 1410 may be disposed with a screw conveyor 1500 to deliver a raw material to a top portion of the bucket elevator 1410. The flask 1420, the sanding barrel 1480, and the sand hopper 1490 may be fixed to a same side of the bucket elevator 1410 from top and bottom. The sand hopper 1490 may be fixedly connected with a bunker of the bucket elevator 1410. A bottom portion of the sand hopper 1490 may be in communication with the bucket elevator 1410. The flask 1420 may be a tank with an upward opening. The flask 1420 may be disposed below a discharge port 1411 on a top portion of the bucket elevator 1410.

The housing 1450 may be disposed between the flask 1420 and the sand hopper 1490. The housing 1450 may be a semi-closed structure. The housing 1450 may be surrounded by the sanding barrel 1480 and the sand hopper 1490. A below surface of the housing 1450 may be open to a front of the operation position.

The motor 1440 may be fixedly connected with a top plate of the housing 1450. A downward output shaft may be penetrated the top plate of the housing 1450 and connected with the spindle 1460.

A lower end of the spindle 1460 may be disposed with several strip-shaped planar scrapers 1470. In the embodiment, the lower end of the spindle 1460 may be disposed with three planar scrapers 1470 that are centered on a central axis of the spindle 1460 and evenly distributed in a circumferential direction. The planar scrapers 1470 may be disposed in the sanding barrel 1480.

The discharge port 1421 at the bottom portion of the flask 1420 may be placed above the top plate of the sanding barrel 1480 by penetrating the top plate of the housing 1450. A sand screen mesh 1530 may be disposed at the bottom portion of the sanding barrel 1480. A screen mesh 1430 may be tilted on an upper portion of the flask 1420. An opening may be disposed on a side wall of the flask 1420 corresponding to a position at a low end of the screen mesh 1430. A garbage bin 1510 may be disposed below the opening.

Dust suction pipes 1520 may be vertically disposed on both sides of the housing 1450. A suction port on an upper end of the dust suction pipe 1520 may be disposed on an upper portion of a side wall of the flask 1420 and communicated with an inner chamber of the flask 1420. A suction port on a below end of the dust suction pipe 1520 may be disposed on a side wall of the housing 1450 above the sand hopper 1490 and communicated with an inner chamber of the housing 1450.

Figure 12:
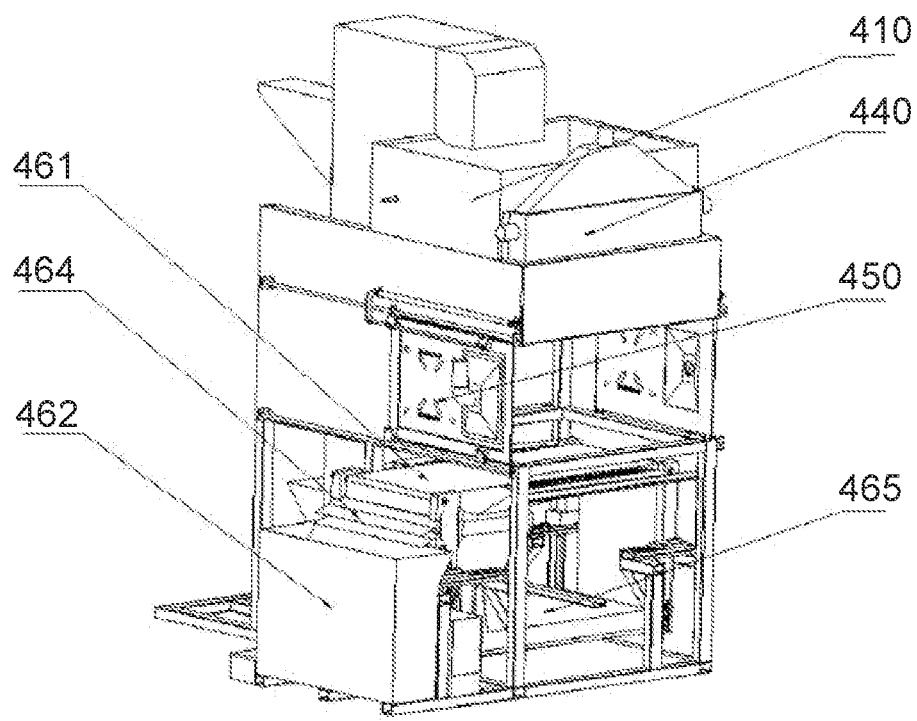
FIG. 12 is a schematic diagram illustrating a sanding device according to some embodiments of the present disclosure.
Figure 13:
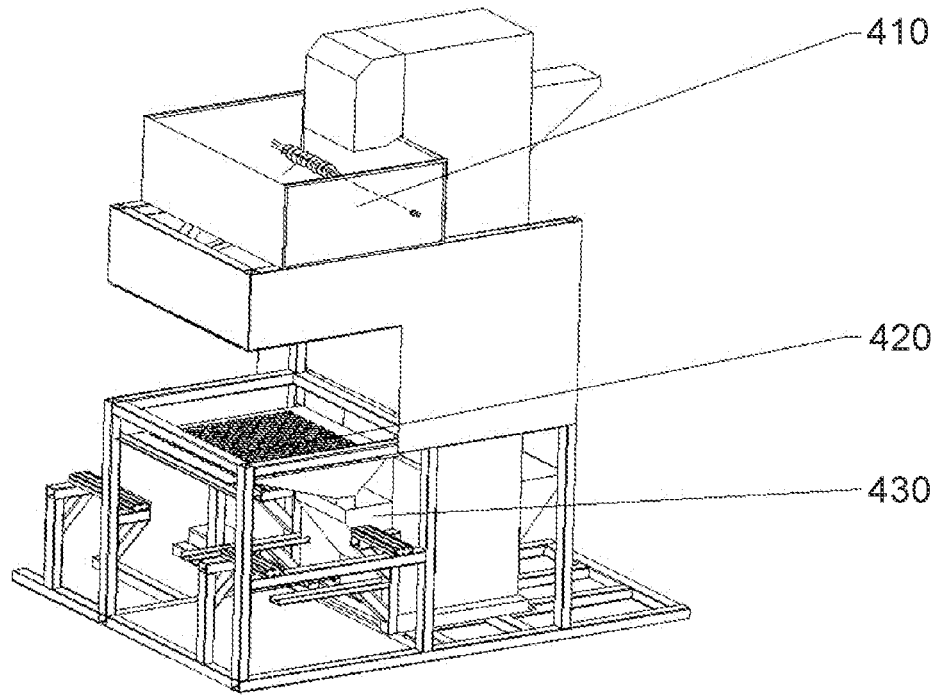
FIG. 13 is a schematic perspective diagram illustrating a main frame of the sanding device in FIG. 12.
Figure 14:
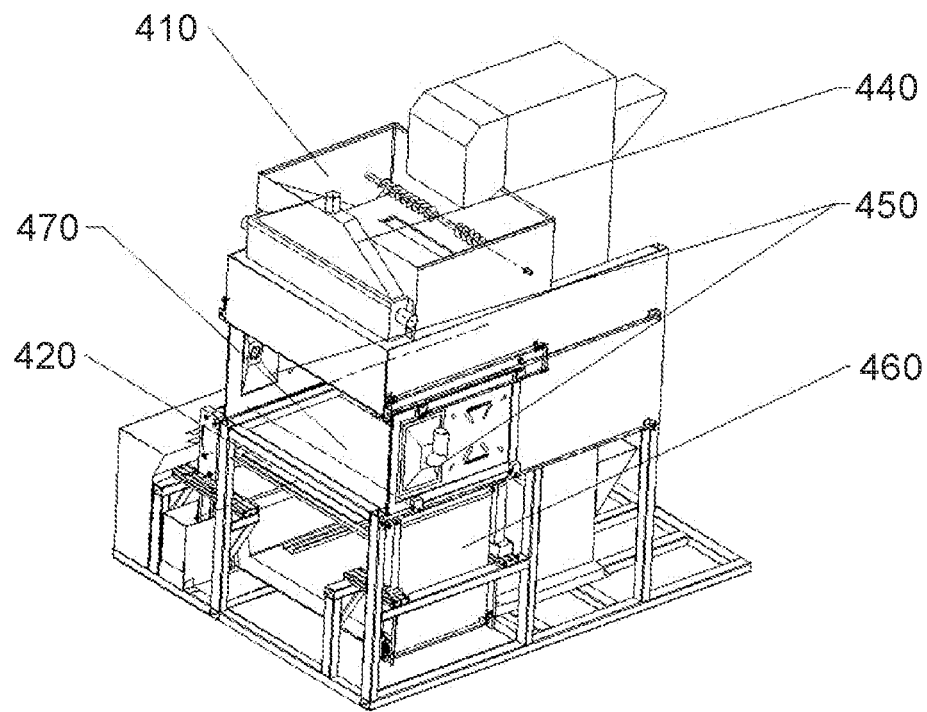
FIG. 14 is a schematic perspective diagram illustrating a dust suction structure of the sanding device in FIG. 12.
Figure 15:
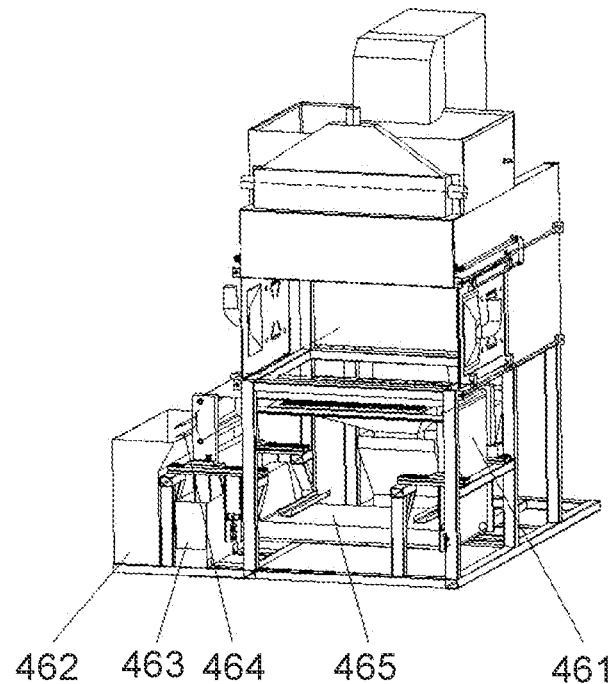
FIG. 15 is a schematic perspective diagram illustrating a filtration device of the sanding device in FIG. 12.

FIG. 12 is a schematic diagram illustrating a sanding device according to some embodiments of the present disclosure. FIG. 13 is a schematic perspective diagram illustrating a main frame of the sanding device in FIG. 12. FIG. 14 is a schematic perspective diagram illustrating a dust suction structure of the sanding device in FIG. 12. FIG. 15 is a schematic perspective diagram illustrating a filtration device of the sanding device in FIG. 12.

As shown in FIGS. 12-15, the sanding machine may include a sand hopper 410, a screen mesh 420, a bunker 430, a dust collection device 440, a lower dust suction port 450, and a filtration device 460. The filtration device 460 may include a belt screen mesh 461, a waste collection tank 462, a cleaning tank 463, a blade 464, and a drying device 465. The sand hopper 410 may be a rectangular container with an upward opening. A downward outlet of the sand hopper 410 located at a top floor may be against the screen mesh 420 disposed below the sand hopper 410. The bunker 430 may be disposed at an inner side below the screen mesh 420. The dust collection device 440 may be arranged on a front side wall of the sand hopper 410 so as to form a first fixed-point dust suction structure during a sand falling stage of the sand hopper 410. The lower dust suction port 450 may be arranged on left and right sides between the sand hopper 410 and the screen mesh 420 so as to form a second fixed-point dust suction structure during the sand falling stage of the sand hopper. The filtration device 460 may be located directly below the sand hopper 410. The belt screen mesh 461 configured on the filtration device 460 may be driven cyclically by the conveyor chain system 110. A flat section of the belt screen mesh 461 disposed in a frame shape may be placed on the screen mesh 420. The blade 464 may be disposed between the opening portion of the waste collection tank 462 and the belt screen mesh 461. The drying device 465 may be disposed at a bottom portion of the sanding machine. The drying device 465 may be parallel to the cleaned belt screen mesh 461 output by the cleaning tank 463 so as to form a fixed-point air-dry structure for the belt screen mesh 461.

In the above structure, the belt screen mesh 461 may be located directly below the sand hopper 410. The sand and slurry on the ceramic shell may naturally fall on the belt screen mesh 461. Most of the sand may fall through the belt screen mesh 461 to the lower screen mesh 420. The screened sand may be conveyed to the bunker 430 for standby. In addition, the fell slurry and sand may be adhered to the belt screen mesh 461 to form slurry beans. The belt screen mesh 461 may be driven to cause the blade 464 to scrape the slurry beans to the waste collection tank 462. Since a width of the blade 464 is the same as a width of the belt screen mesh 461, the slurry beans may be scrapped. The belt screen mesh 461 that continues to be driven may be entered the cleaning tank 463 to be cleaned, thereby removing remaining slurry. Since a surface of the belt screen mesh 461 is coated with polytetrafluoroethylene, the surface may not get wet. Although the cleaned surface of the belt screen mesh 461 does not get wet, the belt screen mesh 461 may be dried, which may ensure that the belt screen mesh 461 may be used circularly in a dry state.

In the above structure, the belt screen mesh 461 may continue to move circularly. Therefore, the belt screen mesh 461 may be moved relative to the stationary blade 464. Once the slurry is dropped on the belt screen mesh 461 and adhered with the sand, the slurry beans may be formed. The slurry beans may be scraped by the blade 464 during a cycle operation of the belt screen mesh 461. The structure may have good timeliness of scraping, high efficiency, and excellent quality. In addition, two dust suction structures may be disposed on a section of the sanding. Therefore, the subtle dust may be avoided overflowing during the operation for sanding. An operation environment may be remarkably improved, which is beneficial to the physical and mental health of the operator.

In some embodiments, the module may be coated in a plurality of layers of slurry and rained with a plurality of layers of sand. After the module is coated in each layer of slurry and rained with each layer of sand, the module may be dried. The module may be coated in a next layer of slurry and rained with a next layer of sand after the module is sufficiently dried.

In some embodiments, the production line 100 for ceramic shell making may further include a drying device. The drying device may be configured to perform a drying process on the module on the conveyor chain system 110 after the module is coated in slurry and rained with sand. In some embodiments, a drying manner may include air-drying and/or drying. In some embodiments, the drying device may include a plurality of fans and/or heating devices disposed in each direction of the conveyor chain system 110.

In some embodiments, the suspension portion for hanging the module of the conveyor chain system 110 may include a base and a rotation portion. The base may be configured to connect with the conveyance chain for driving the module to move. The rotation portion may be configured to replace the module. The rotation portion may be caused to rotate relative to the base. In some embodiments, the rotation portion hanged the module may rotate relative to the base under an action of the drying device (e.g., a wind of the fan). That is, the module may rotate. During the rotation of the module, the module may be sufficiently dried through the rotation.

In some embodiments, referred to the description regarding the connection of the conveyance chain and the suspension portion, the base and the conveyance chain may be connected via a hanging ring. In some embodiments, referred to the description regarding the connection of the conveyance chain and the suspension portion, the rotation portion may include a replacing groove.

In some embodiments, the control center 160 may also be operably connected with the drying device for cause, based on the control instruction (also referred to as a fourth instruction), the conveyor chain system 110, the robotic arm 120, and the drying device to cooperate with each other. For example, when the module hanged on the conveyor chain system 110 passes through the drying device, the control center 160 may control the start of the drying device. In some embodiments, a start-stop time of the drying device may also be controlled by the control center 160. The start-stop time may be calculated based on each time that the robotic arm 120 spends at a corresponding station. The time that the robotic arm 120 spends at the corresponding station may be obtained according to actual measurement and statistics. In some embodiments, the start-stop time of the drying device may also be controlled by a controller integrated in the drying device. For example, the controller may control the start-stop time of the drying device according to whether the module is inspected in a drying area.

The drying device and the related structure realizing the rotation of the module may be described in detail below with reference to the drawings corresponding to different embodiments.

Figure 16:
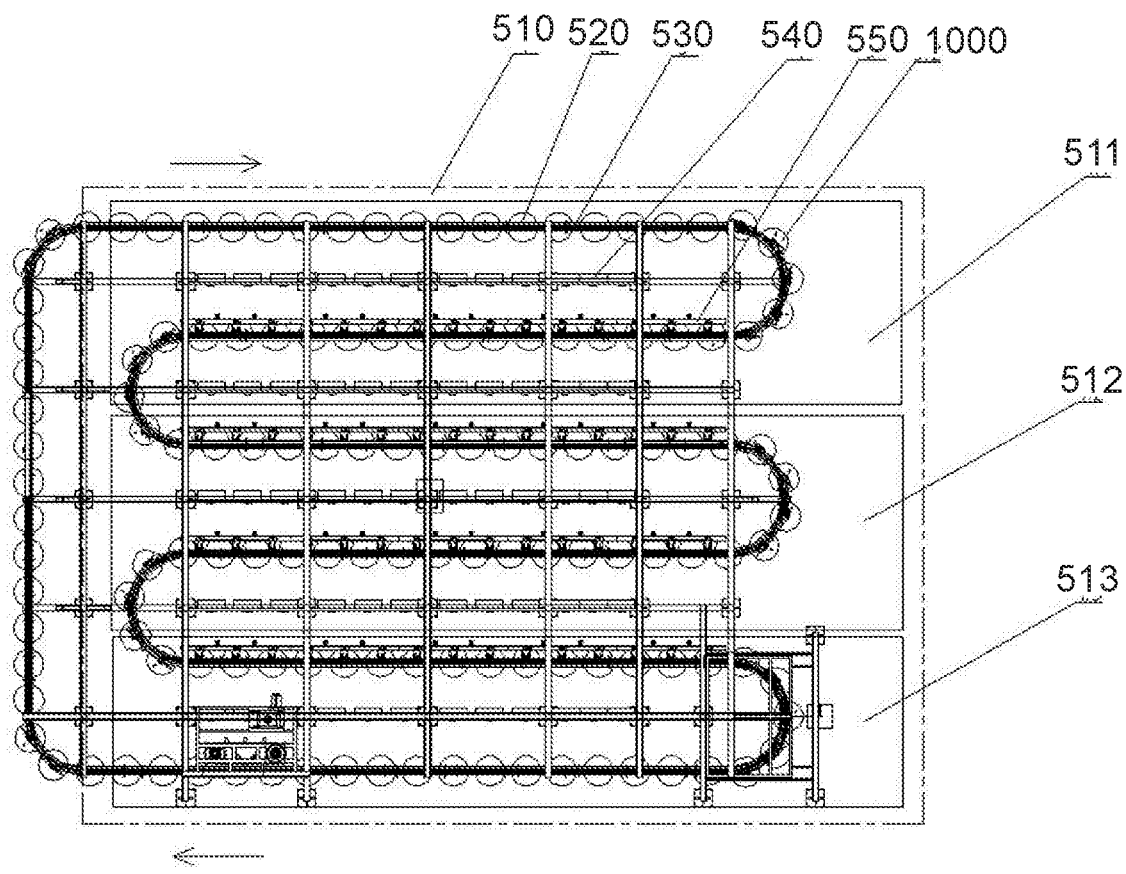
FIG. 16 is a schematic diagram illustrating a drying device for ceramic shell making in precision casting according to some embodiments of the present disclosure.
Figure 17:
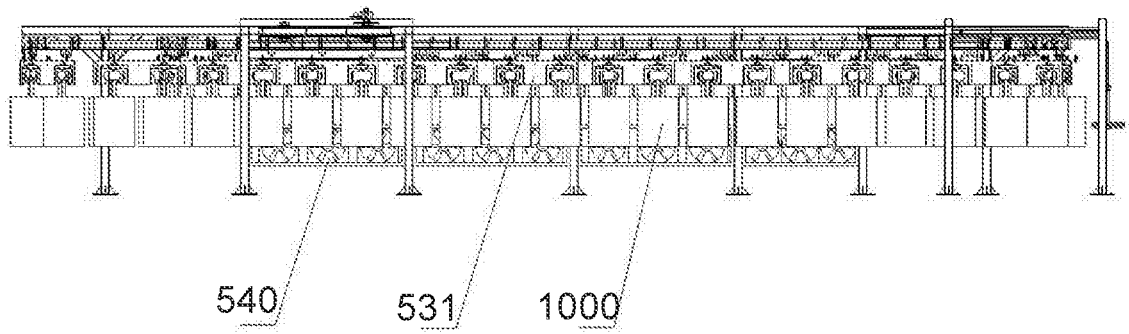
FIG. 17 is a schematic diagram illustrating a side view of the drying device in FIG. 16.

FIG. 16 is a schematic diagram illustrating a drying device for ceramic shell making in precision casting according to some embodiments of the present disclosure. FIG. 17 is a schematic diagram illustrating a side view of the drying device in FIG. 16.

As shown in FIGS. 16-17, the drying device of the production line for ceramic shell making may include a drying room 510, a rail 520, a conveyor chain 530, fans 540, and a driver 550. The drying room 510 may be a house whose plane is rectangular. Walls of the drying room 510 may be disposed with thermal insulation layers. In the embodiment, the drying room 510 may be separated into three drying areas that are communicated with each other and parallel to each other. That is, the drying room 510 may include a three-connected-room. An area located at the upper portion of FIG. 16 may be an initial drying area 511. An area located in the middle of FIG. 16 may be a strengthening drying area 512. An area located in the below portion of FIG. 16 may be a curing and drying area 513. A channel for the rail 520 and the conveyor chain 530 to pass through may be disposed on a left wall of the initial drying area 511 and the curing and drying area 513, respectively. An outer side of a wall of the disposed channel may be a removing and replacing area. The rail 520 may include an annular rail. The rail 520 arranged at the outer side of the drying room 510 may be configured to replace and remove the module 1000. The rail 520 in the drying room 510 may be bent and disposed along a longitudinal direction of the three drying areas. The rail 520 between adjacent drying areas may also be bent, thereby forming a multi-curve channel that communicates the inside and outside of the drying room 510. The conveyor chain 530 refers to an annular chain that moves along the rail 520. The conveyor chain 530 may be disposed with hangers 531 based on joints of the conveyor chain 530. The module 1000 may be moved with the hangers 531. The fans 540 may be disposed between adjacent straight sections of the conveyor chain 530. The horizontally arranged fans 540 may be parallel to the straight section of the conveyor chain 530. The arranged fans 540 may be against the module 1000. Wind directions of the fans 540 may be the same. In the embodiments, the wind directions of the fans 540 may be blown from the bottom to top in FIG. 16. The driver 550 in the present disclosure may be configured to improve a drying speed and dry uniformity. The driver 550 may be disposed at a same side as the straight section of the conveyor chain 530. An output end of the driver 550 may be rubbed against the outer wall of the hanger 531 configured on the conveyor chain 530 to cause the module 1000 moving with the conveyor chain 530 to rotate in a same direction. A rotation speed of the module 1000 in the embodiment may be 8 rpm. Since the dried module 1000 is moving and rotating in the drying room 510, there may be no windward and leeward sides during the drying process. Therefore, the drying uniformity of the module 1000 may be significantly improved.

In some embodiments, in order to further improve the drying uniformity of the module, a drying production line for rotating the module may be further used to dry the module. The drying production line for rotating the module may include a drying room, a rail, a conveyor chain, fans, and a driver. The drying room may be separated into a plurality of drying areas that are communicated with each other and parallel to each other. A count (number) of the drying areas may be within a range of 2 to 9. A temperature value of each drying area may be set different from temperature values of other drying areas. A channel for the rail and the conveyor chain to pass through may be disposed on a side wall of the drying room. The rail may include an annular rail. The rail in the drying room may be bent and disposed along a longitudinal direction of the drying areas. The rail between adjacent drying areas may also be bent. The conveyor chain refers to an annular chain that moves along the rail. The conveyor chain may be disposed with hangers based on joints of the conveyor chain. The module may be moved with the hangers. The fans may be disposed between adjacent straight sections of the conveyor chain. Wind directions of the fans may be the same. The driver may be disposed at a same side as the straight section of the conveyor chain. The module may be driven to rotate through a friction.

Figure 18:
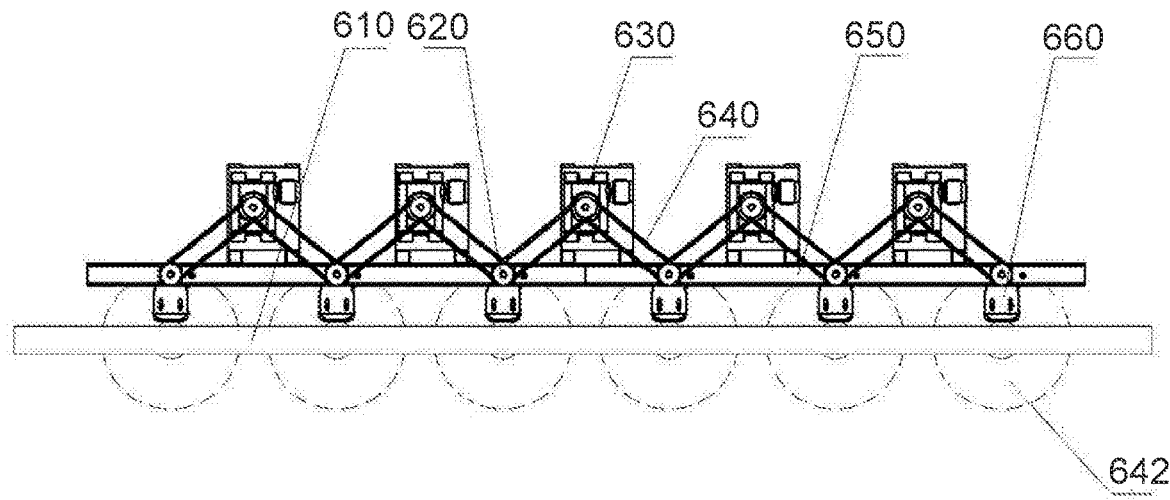
FIG. 18 is a schematic diagram illustrating a drying device for rotating a module in a production line according to some embodiments of the present disclosure.
Figure 19:
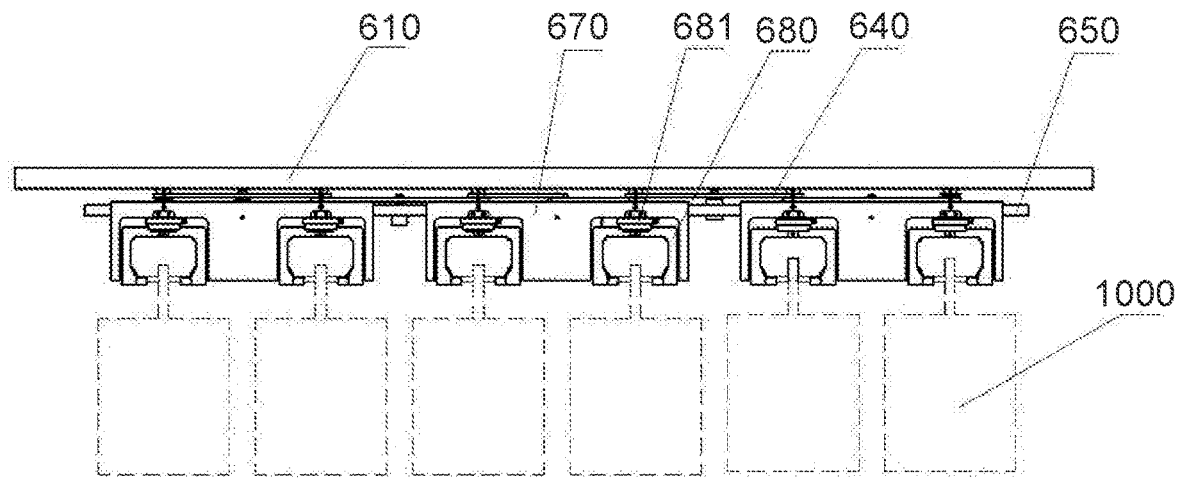
FIG. 19 is a schematic diagram illustrating a front view of the drying device in the production line in FIG. 18.
Figure 20:
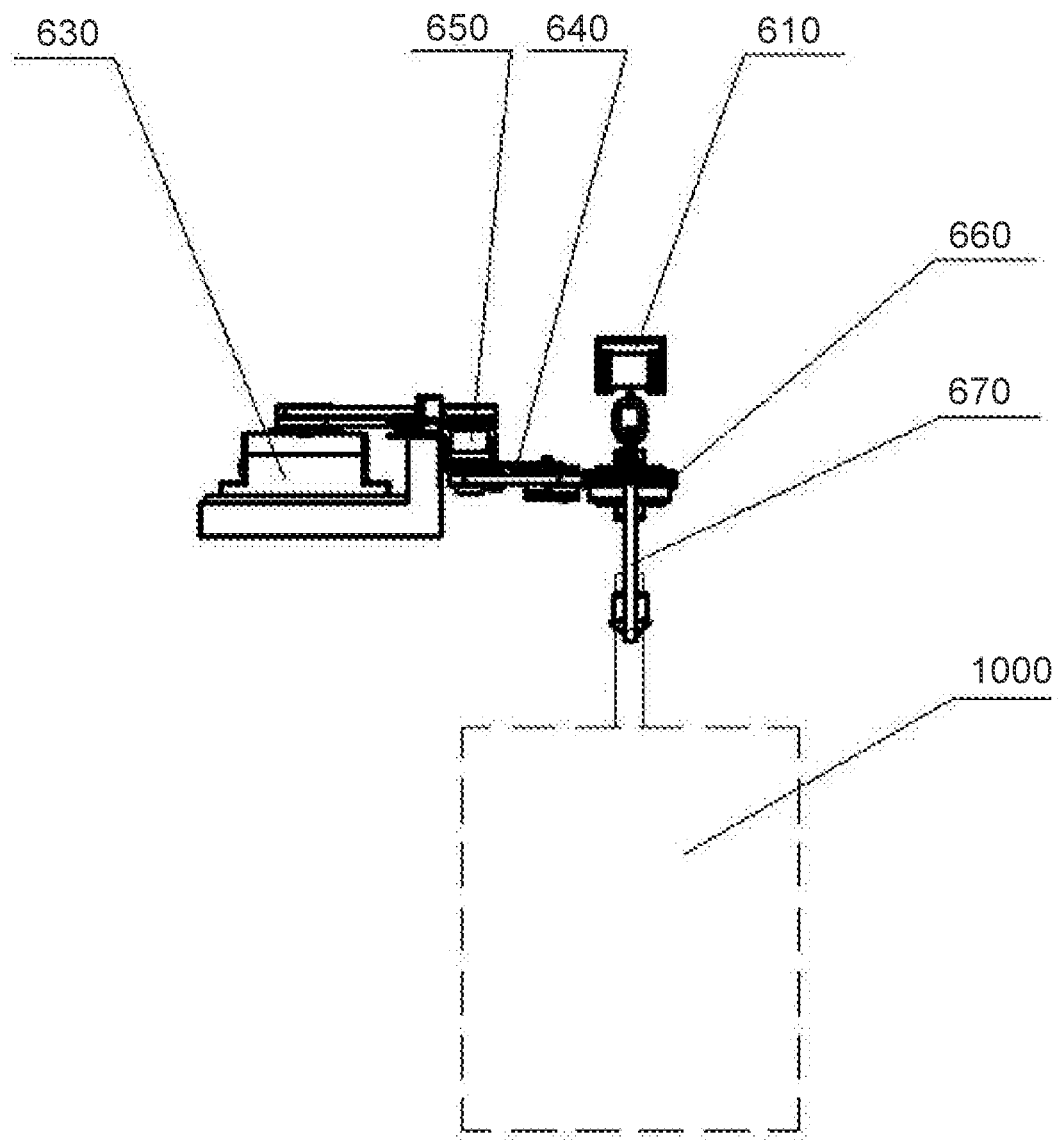
FIG. 20 is a schematic diagram illustrating a side view of the drying device in the production line in FIG. 18.

FIG. 18 is a schematic diagram illustrating a drying production line for rotating a module according to some embodiments of the present disclosure. FIG. 19 is a schematic diagram illustrating a front view of the drying device in the production line in FIG. 18.

As shown in FIGS. 18-19, the figure may include a section of the drying production line for rotating the module. The drying production line for rotating the module refers to a production line with a chain conveyance. A structure of the drying production line for rotating the module may include a rail 610, one or more belt pulleys 620, one or more reducers 630, one or more belts 640, one or more fixing seats 650, one or more drivers 660, one or more bases 670, and one or more hooks 680. The rail 610 may be a base member. A cross-section of the rail 610 may be similar to a cross-section of a channel steel. A surface of the hanged rail 610 with an open may be faced downward. The base 670 that is axially displaceable may be hanged at equal intervals in a groove of the rail 610. The base 670 may be a rectangular plate. Each base 670 may be disposed with two rectangular openings facing downward. Each hook 680 refers to a carrier for hanging a module 690 (e.g., a workpiece module). A shape of the hook 680 may be similar to a "C" shape. The hook 680 may be hanged in the rectangular opening of the base 670. A side of the hook 680 with an opening may be faced downward. Two inner hooks may be disposed coaxially and opposite to each other. A cross-section of the inner hook may be a "V" shape with an opening facing upward. An included angle α of the "V" shape in the embodiments may be equal to 90 degrees. A vertical rotation shaft 681 including a friction wheel, an upper cover, a mandrel, a bearing, and a bearing seat may be disposed in the middle of the solid side of the hook 680 facing upward. The upper cover located at a top portion of the rotation shaft 681 may be hanged with the base 670. The built-in bearing may be cooperated with the bearing seat and the mandrel. A vertical lower end of the mandrel may be connected with the hook 680. The bearing in the embodiment may include a planar ball bearing. A load of the mandrel bearing the hook 680 and a load of the workpiece module 690 may be borne by the bearing. A friction may include a rolling friction. The hook 680 may be very flexible. A power of the rotation of the hook 680 may be introduced by the friction wheel. The friction wheel arranged in the structure may be fitted with a gap of the bearing seat, each of which may be freely rotatable. However, the external friction wheel may be connected with the mandrel. The friction wheel moving with the hook 680 may be in contact with the driver 660 spaced apart on the fixing seat 650 to generate a rotation. Since the friction wheel, the mandrel, and hook 680 are an integral structure, the friction wheel may drive the hook 680 to rotate. The fixing seat 650 refers to a strip member disposed outside the rail 610. The driver 660 may be disposed on the fixing seat 650 according to the interval between the module 1000 hanged on the rail 610. Each driver 660 may be configured with a belt 640. In the embodiment, six drivers 660 may be configured on a section of fixing seat 650. In addition, the reducer 630 may be disposed at a middle position on the outer side of the fixing seat 650. The drivers 660 arranged in sequence on both sides may be driven by the belt pulley 620 configured at an output end of the reducer 630 through the belt 640. Once the rotating driver 660 is in contact with the friction wheel, kinetic energy may be obtained by the stationary friction wheel. Therefore, the hook 680 may be driven to rotate. The module 1000 hanged on the hook 680 may also be driven to rotate. In the present disclosure, the belt pulley 620 disposed in the reducer 630 and the driver 660 may be a dual-gang structure. Diameters of the two wheels may be the same. Therefore, rotation speeds of the hooks 680 may be the same. In the drying room, the module 1000 may be moved and rotated with the drying production line. The position of the module 1000 may be always dynamic to increase a rapid precipitation of moisture in the slurry. Therefore, each portion of the module 1000 may be easy to be uniformly dried. Besides a good consistency of the drying quality of the workpiece module 1000 in actual use according to the present disclosure, the drying production efficiency of the drying form with a continuous flow may also be more than three times higher than the drying efficiency of batch drying, which may fully meet requirements of batch production.

Further, the drying production line for rotating the module may include a rotatable hanger. The rotatable hanger may include a base, a hook, a friction wheel, an upper cover, a mandrel, a bearing, and a bearing seat. The base may be a rectangular plate. A side at a bottom of each base may be disposed with two rectangular openings facing downward. A pair of open inner hooks with a same length may be formed on both sides of an opening reserved at a bottom of the hook. A middle position of an upper side of the hook may be disposed with a shaft structure formed by the upper cover, the mandrel, the bearing, and the bearing seat. A reserved groove on an upper end surface of the upper cover may be fitted with the base through a bolted connection, so that the hook hanged in the opening of the base may be rotated with the mandrel. The mandrel may be connected with the friction wheel. The friction wheel may rub with an external triangle belt during a moving operation to obtain kinetic energy, thereby rotating with the mandrel. Therefore, the workpiece module hanged on the hook may be rotated synchronously.

Figure 21:
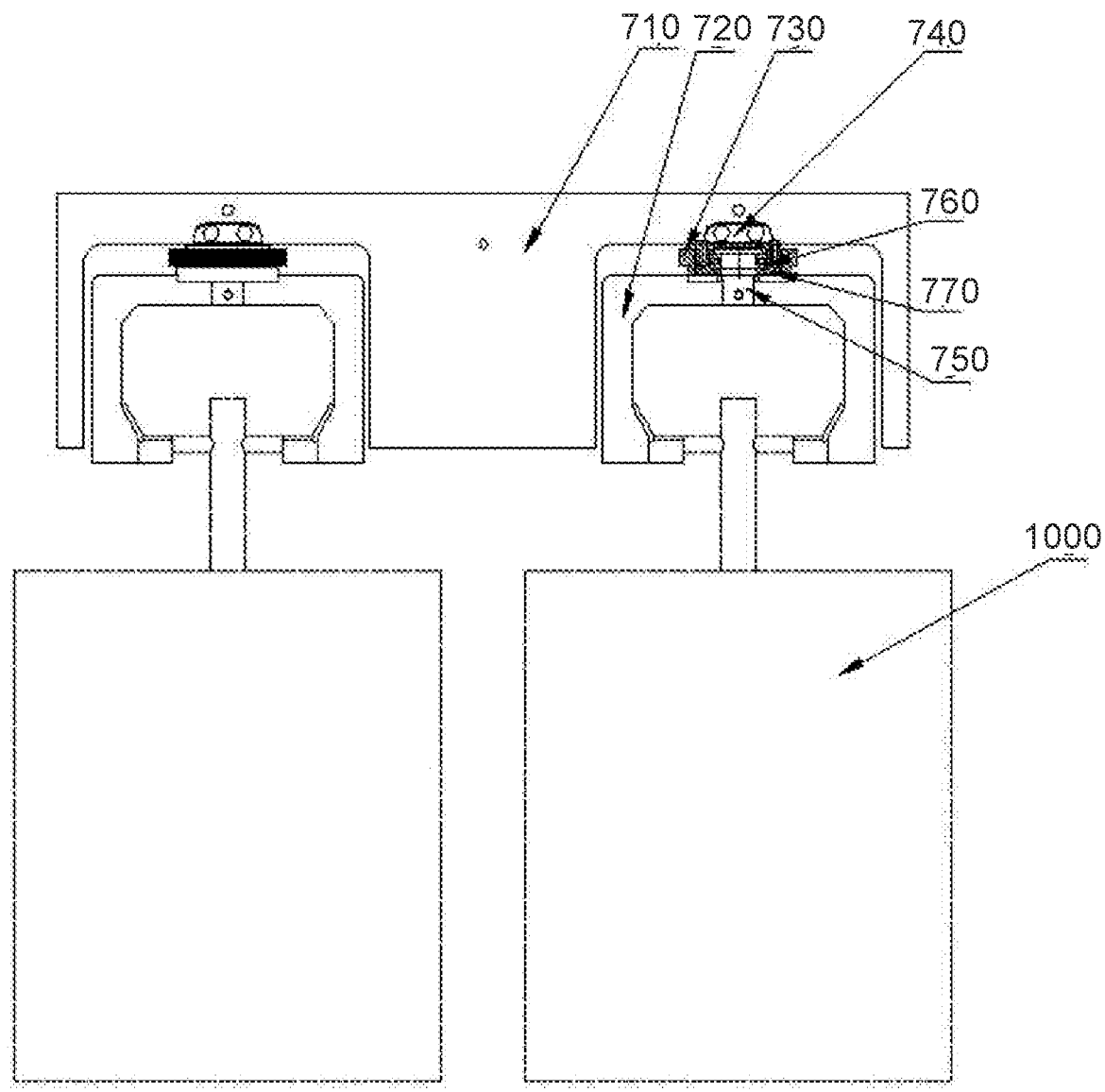
FIG. 21 is a schematic diagram illustrating a rotatable hanger according to some embodiments of the present disclosure.
Figure 22:
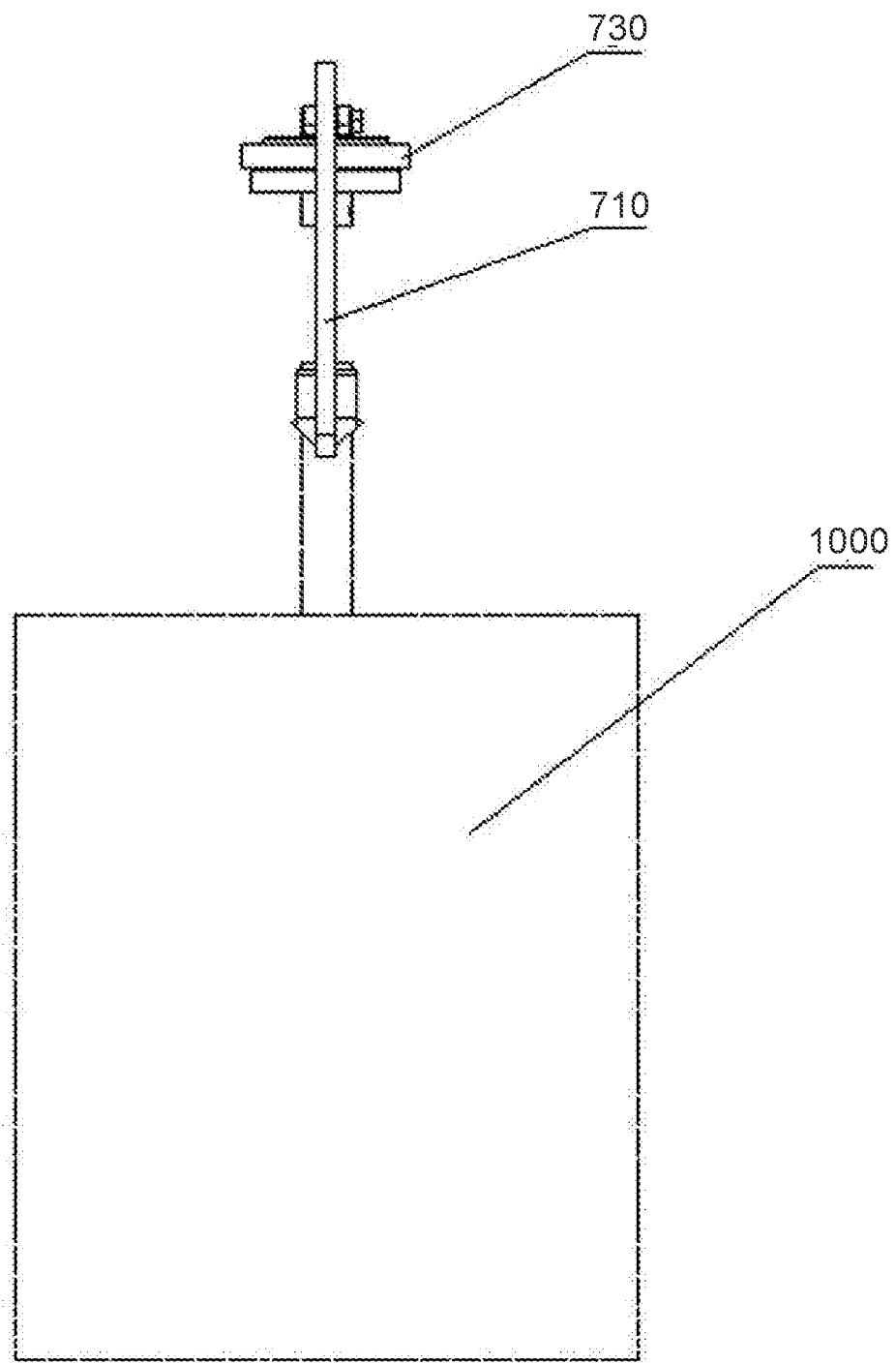
FIG. 22 is a schematic diagram illustrating a side view of the rotatable hanger in FIG. 21.
Figure 23:
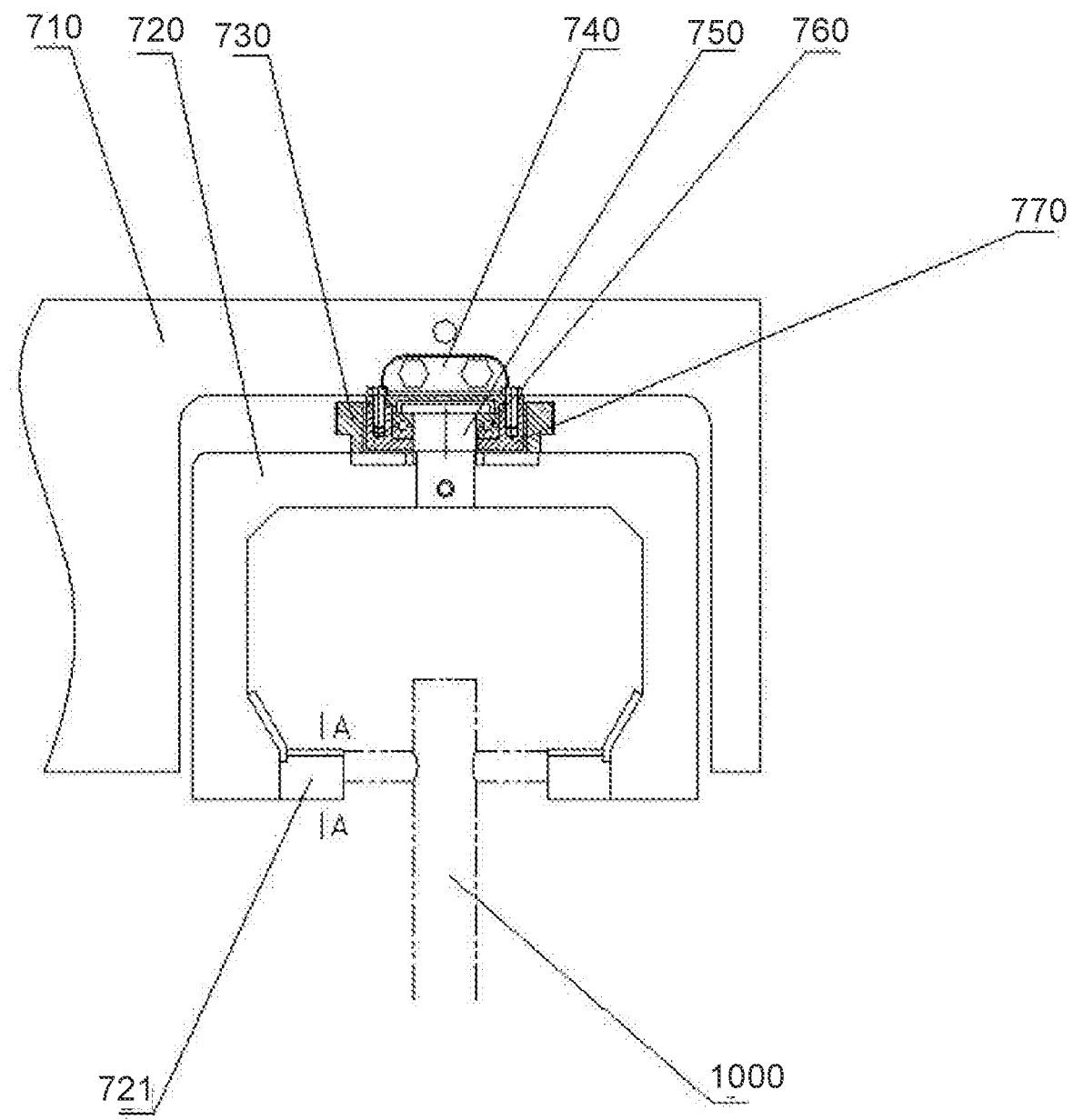
FIG. 23 is a schematic diagram illustrating an enlarged view of a portion of the rotatable hanger in FIG. 21.
Figure 24:
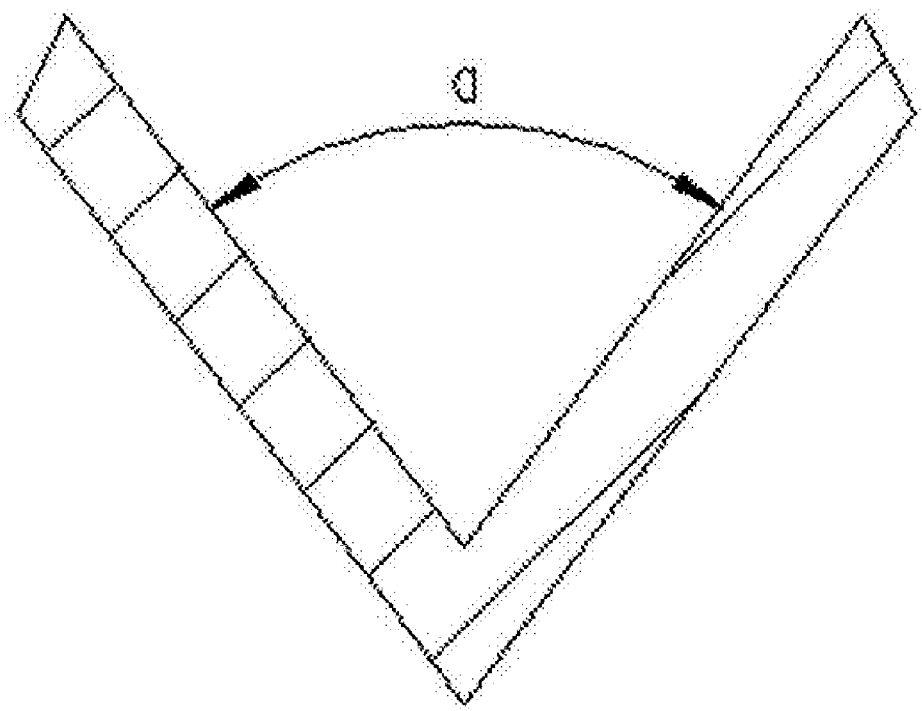
FIG. 24 is a schematic diagram illustrating an enlarged view of an A-A cross-section in FIG. 23.

FIG. 21 is a schematic diagram illustrating a rotatable hanger according to some embodiments of the present disclosure. FIG. 22 is a schematic diagram illustrating a side view of the rotatable hanger in FIG. 21. FIG. 23 is a schematic diagram illustrating an enlarged view of a portion of the rotatable hanger in FIG. 21. FIG. 24 is a schematic diagram illustrating an enlarged view of an A-A cross-section in FIG. 23.

The rotatable hanger as shown in FIGS. 21-24 refers to a hanger for hanging a workpiece module in precision casting. The rotatable hanger may include a base 710, a hook 720, a friction wheel 730, an upper cover 740, a mandrel 750, a bearing 760, and a bearing seat 770. The base 710 may be a carrier member of the rotatable hanger. The base 710 refers to a rectangular plate placed horizontally and vertically. The bases 710 arranged in sequence in a production line for drying modules may be connected through a chain connection. Each base 710 may be used as a conveyance unit. In the embodiment, two rectangular grooves with openings facing downward may be disposed at symmetrical positions on a bottom side of the base 710. The groove may be configured to accommodate the hook 720. A shape of the hook 720 may be similar to a "C" shape. A pair of inner hooks 721 with a same length may be formed on both sides of an opening reserved at a middle position of a bottom of the hook. The two inner hooks 721 may be configured to hang the workpiece module 1000. In order to hang or remove the workpiece module 1000 smoothly, the inner hook 721 may be an open structure. A shape of the inner hook 721 may be shown in FIG. 23 and FIG. 24. An A-A cross-section may be a "V" shape. An included angle α of the "V" shape may be within a range of 45 degrees to 90 degrees. In the embodiment, the included angle α of the "V" shape may be equal to 90 degrees. A connection between the hook 720 and the base 710 may include a connection structure of a rotation shaft, so that the hanged hook 720 may be rotated around a fixed shaft. In the present disclosure, a middle position of an upper side of the hook 720 may be disposed with a shaft structure formed by the upper cover 740, the mandrel 750, the bearing 760, and the bearing seat 770. In order to hang the hook 720 to the base 710, an upper end surface of the upper cover 740 may be reserved a groove fitted to the base 710. After the reserved groove is fitted to the base 710, the reserved groove and the base 710 may be connected by bolted, so that the hook 720 hanged in the opening of the base 710 may be rotated with the mandrel 750. In order to ensure that the hook 720 continues to rotate when the base 710 is moved in the present disclosure, the friction wheel 730 may be fitted with a coaxial gap on the bearing seat 770. In the structure, the friction wheel 730 may be connected to the mandrel 750. A power may be introduced, by the friction wheel 730, to drive the mandrel 750 to rotate when the base 710 is moved. The hook 720 may be caused, by the mandrel 750, to rotate. In order to further enhance a friction effect of the friction wheel 730 in the present disclosure, a pattern may be pressed on an outer circle of the friction wheel 730 with a large diameter to increase a friction coefficient to ensure that the hook 720 has sufficiently persistent rotation power.

The hook 720 in the embodiment may be rotated with the mandrel 750. Kinetic energy may be obtained by rubbing between the friction wheel 730 and an external triangle belt during a moving operation of the base 710. Therefore, a workpiece ceramic shell 780 hanged on the hook 720 may be rotated synchronously. During the drying process, the workpiece ceramic shell 780 may not be fixed, so that each portion of the workpiece ceramic shell 780 obtains a same drying condition. Therefore, the dry quality and drying efficiency of the workpiece ceramic shell 780 may be significantly improved.

Further, the rotation of the rotatable hanger may be restrained at any time in the use operation, so that the module hanged on the rotatable hanger may be operated by other devices (e.g., the robotic arm 120) of the production line 100 for ceramic shell making. The restraining the rotation of the rotatable hanger may be performed via a device for positioning and restraining a rotation of a ceramic shell hanged on a conveyance chain. The device for positioning and restraining the rotation of the ceramic shell hanged on the conveyance chain may include a pillar, a rail, a base, a brake lever, a sensor, and a hanger. The rail may include a strip rail. The bases through a lateral series connection may be driven along the rail. Hangers may be equipped in two downward rectangular openings of the base, respectively. The base may be hanged in the rail via a roller with a built-in hanger. The hanger and the hanged ceramic shell may be rotated relative to the base. The brake lever may be placed on a side of the rail adjacent to the robotic arm 120. A height of the brake lever may be located in the middle of the base and parallel to the rail. Two ends of a bent segment may be disposed outward. The sensor may be arranged at an upper edge of the middle of the base. A sensing area of the sensor may face the robotic arm 120. The pillar refers to a flexible rod facing downward. A mounting position of a fixed end of the pillar may be located at a front end of a removing area of the rail (i.e., an end portion of a front opening of the brake lever).

Figure 25:
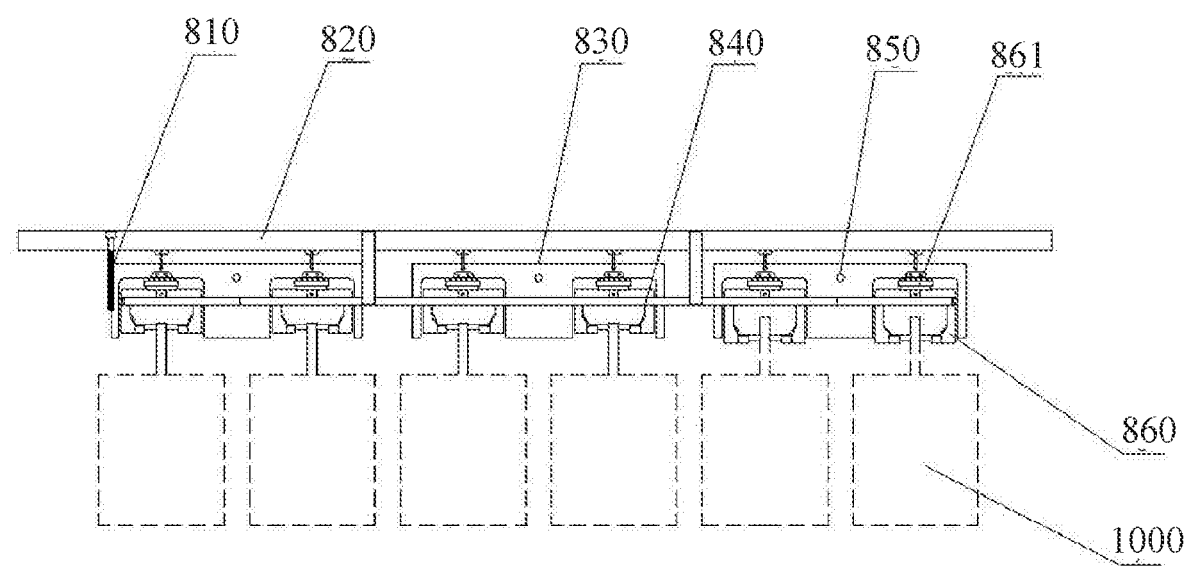
FIGS. 25-27 are schematic diagrams illustrating a device for positioning and restraining rotation of a ceramic shell hanged on a conveyance chain according to some embodiments of the present disclosure.
Figure 26:
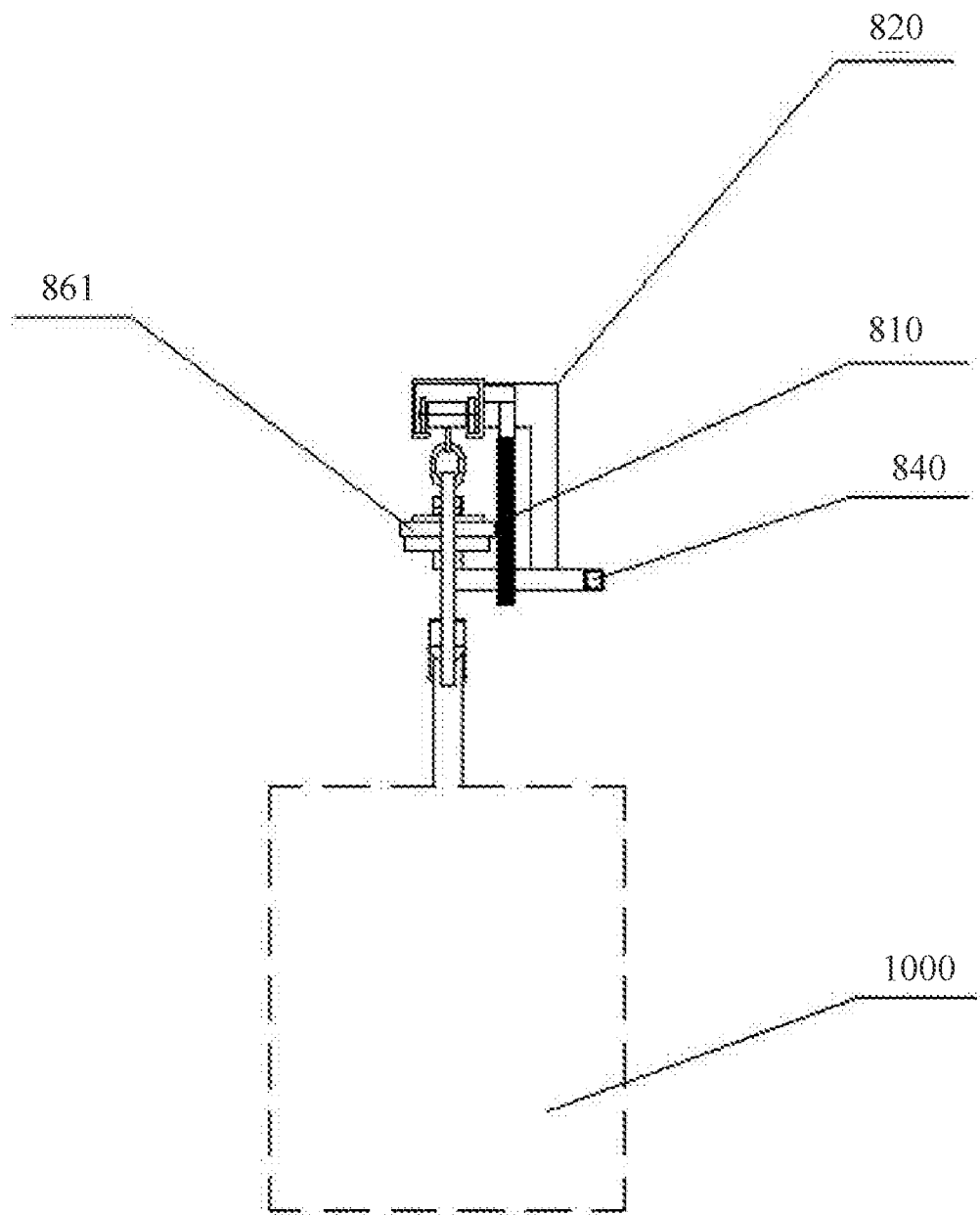
Figure 27:
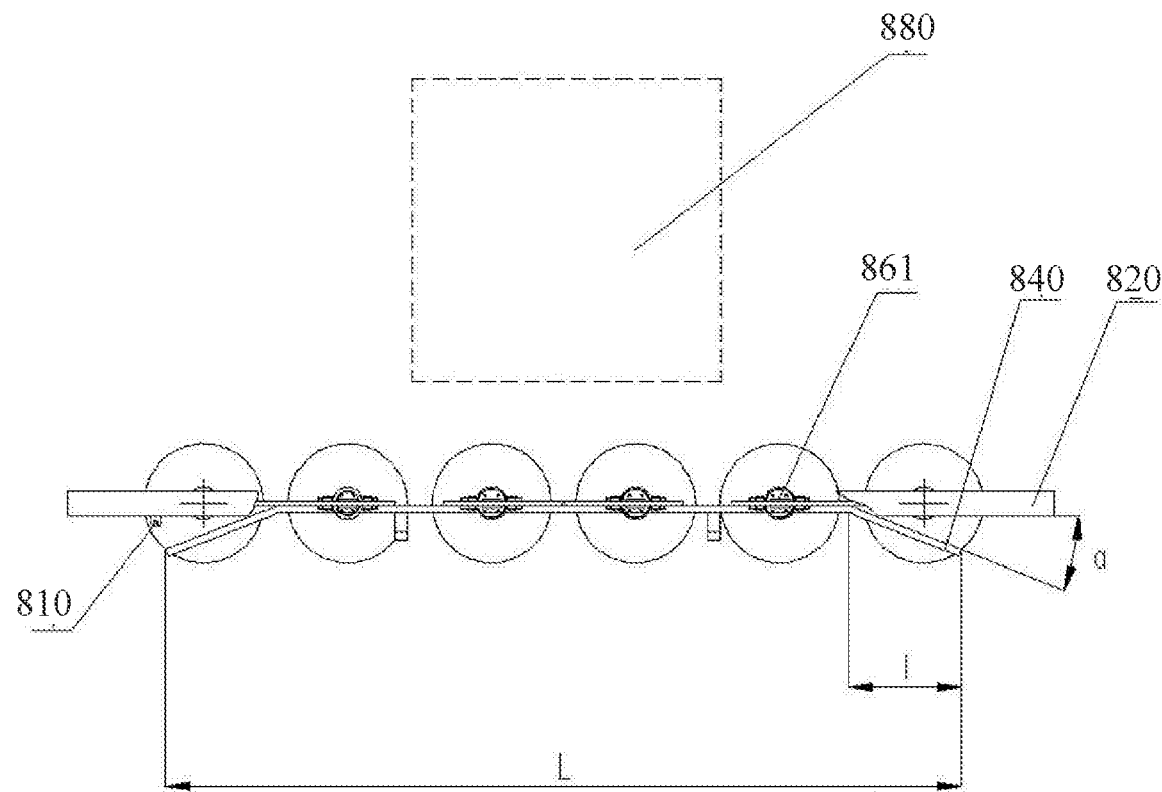

FIGS. 25-27 are schematic diagrams illustrating a device for positioning and restraining a rotation of a ceramic shell hanged on a conveyance chain according to some embodiments of the present disclosure. As shown in FIGS. 25-27, the device for positioning and restraining the rotation of the ceramic shell hanged on the conveyance chain may include one or more pillars 810, a rail 820, one or more bases 830, a brake lever 840, one or more sensors 850, and one or more hangers 860. The rail 820 may include a strip rail with a downward opening that is made of channel steel. A layout of the rail 820 may be arranged to satisfy requirements of the drying process and a corresponding drying room. The horizontal rail 820 may include straight segments and circular arcs. FIG. 25 is a schematic diagram illustrating a structure of a section of a removing area of the drying production line. The base 830 may include a sheet member. The base 830 may be a carrier of the hanger 860. The base 830 may be hanged in the rail 820 via a roller 861 with the built-in hanger 860. The built-in hanger 860 and the hanged module 1000 may be rotated relative to the base 830. The base 830 in the present disclosure may be connected in series in a horizontal sequence, thereby forming a chain conveyance structure to create conditions for continuous production. During the drying process, the rotation of the hanger 860 may be used to overcome the uneven drying problem that the module 1000 is hanged by the hanger 860. However, the hanger 860 and the hanged module 1000 entering the removing area may be in a rotation state under an action of inertia, so that the corresponding robotic arm 880 does not receive an exact position signal of the module 1000 to be removed. Therefore, the module 1000 may not be accurately removed. In order to accurately remove the module 1000, the brake lever 840 may be disposed on a front side of the rail 820 facing the corresponding robotic arm 880 and parallel to the robotic arm 880 in the present disclosure. As shown in FIG. 26, the brake lever 840 may include a slender rod with outward bending angles at both ends. In the embodiments, a length L of the brake lever 840 is 850 millimeters. A length l of the bend is 100 millimeters. Acute angles of the two ends are equal. In some embodiments, the acute angle α may be equal to 30 degrees. When the brake lever 840 is arranged, the two ends of the bending segment may be disposed outward. Therefore, a guided braking structure with open ends at both ends may be formed so as to restrain the rotation of the module 1000 introduced with the hanger 860. In order to facilitate that the corresponding robotic arm 880 accurately removes the module 1000 after the drying process is performed and the rotation is restrained, the sensor 850 may be arranged on a plate surface of the base 830, to facilitate that the corresponding robotic arm 880 may position and remove the module 1000. The sensor 850 used in the embodiment may include a positioning sensor. The sensor 850 may be directly arranged at an upper edge of the base 830. A sensing area of the sensor 850 may face the corresponding robotic arm 880. The pillar 810 refers to a flexible rod facing downward. A mounting position of a fixed end of the pillar 810 may be located at a front end of the removing area of the rail 820 (i.e., an end portion of a front opening of the brake lever). The pillar 810 in the embodiment is a cylindrical compression spring having sufficient elasticity and flexibility. The pillar 810 may have a buffering function for the conveyed hanger 860 in the structure. The pillar 810 may be used to reduce an impact force of the module 1000 introduced with the hanger 860 before the rotation is restrained, which facilitates to reduce a load of the brake lever 840 to restrain the rotation. A translation of the hanger 860 may be rapidly positioned. Therefore, the corresponding robotic arm 880 may quickly and accurately pick the module 1000 hanged on the hanger 860. During an actual use of the present disclosure, besides significantly improving the efficiency of the removing, the noise of the movement may be reduced, and the operation environment may be improved.

In some embodiments, the rotatable hanger may also include a driver configured to drive the rotation. The driver may include a spindle, a large belt pulley, a frame, a pin roll, a conveyance wheel, a belt, and a small belt pulley. Both ends of the spindle configured on the frame may be equipped with the large belt pulley and the small belt pulley, respectively, so as to form a coaxial rotation structure on both sides of the frame. Two conveyance wheels positioned by the pin roll may be symmetrically arranged on an extension plate at one side of the frame. The small belt pulley and the conveyance wheel may be located at a same side of the frame. The conveyance wheel and the hanger may be located on a same side. The belt may be wound around the small belt pulley and the two conveyance wheels, thereby forming a belt conveyance structure with a shape of an isosceles triangle. An outer wall of the belt at a bottom of the isosceles triangle may be in contact with an outer wall of the hanger hanged on one side. The hanger may be driven to rotate through a kinetic friction.

Figure 28:
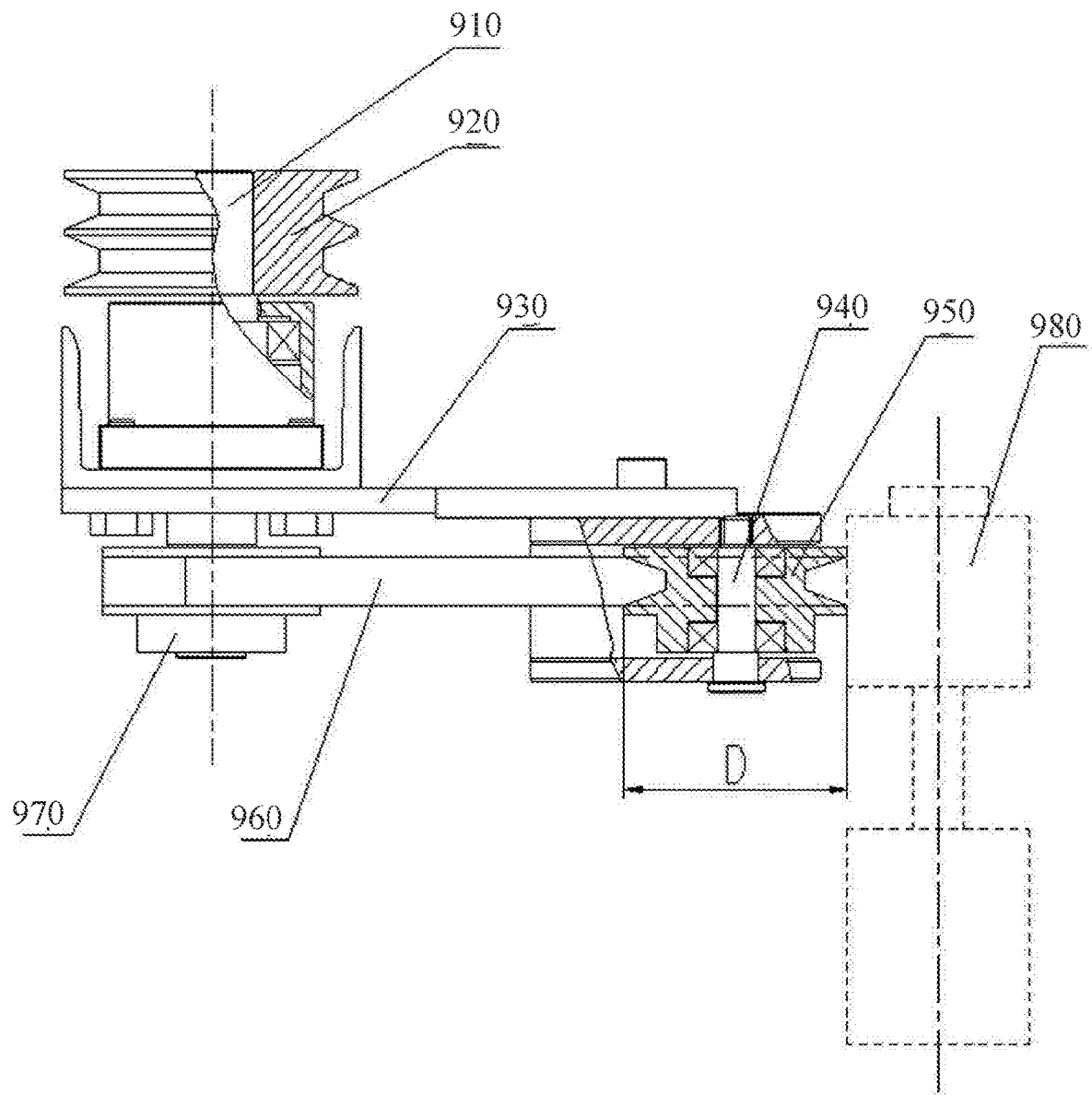
FIG. 28 is a schematic diagram illustrating a driver for assisting rotation of a hanger hanged on a drying line according to some embodiments of the present disclosure.
Figure 29:
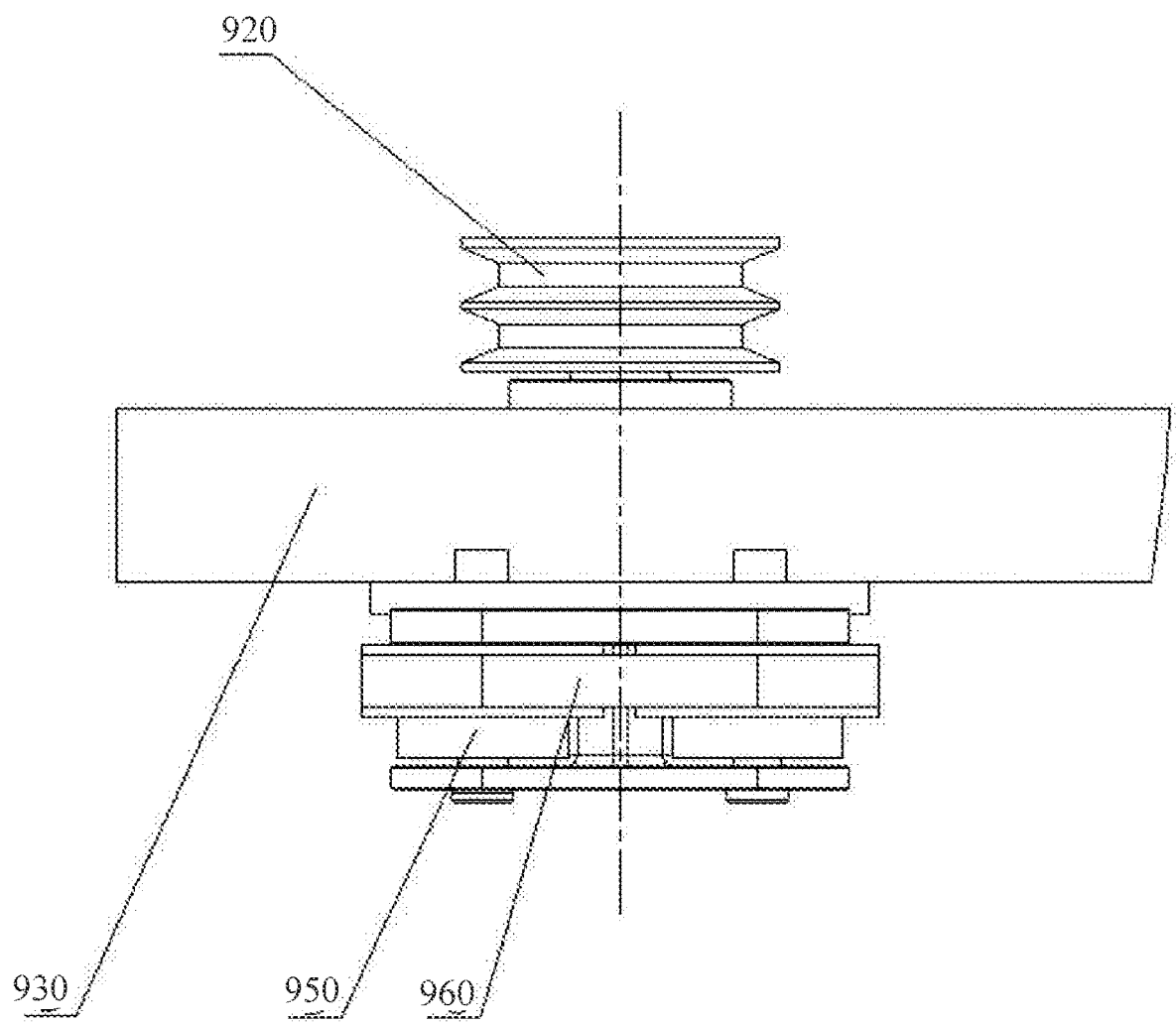
FIG. 29 is a schematic diagram illustrating a side view of the driver in FIG. 28.
Figure 30:
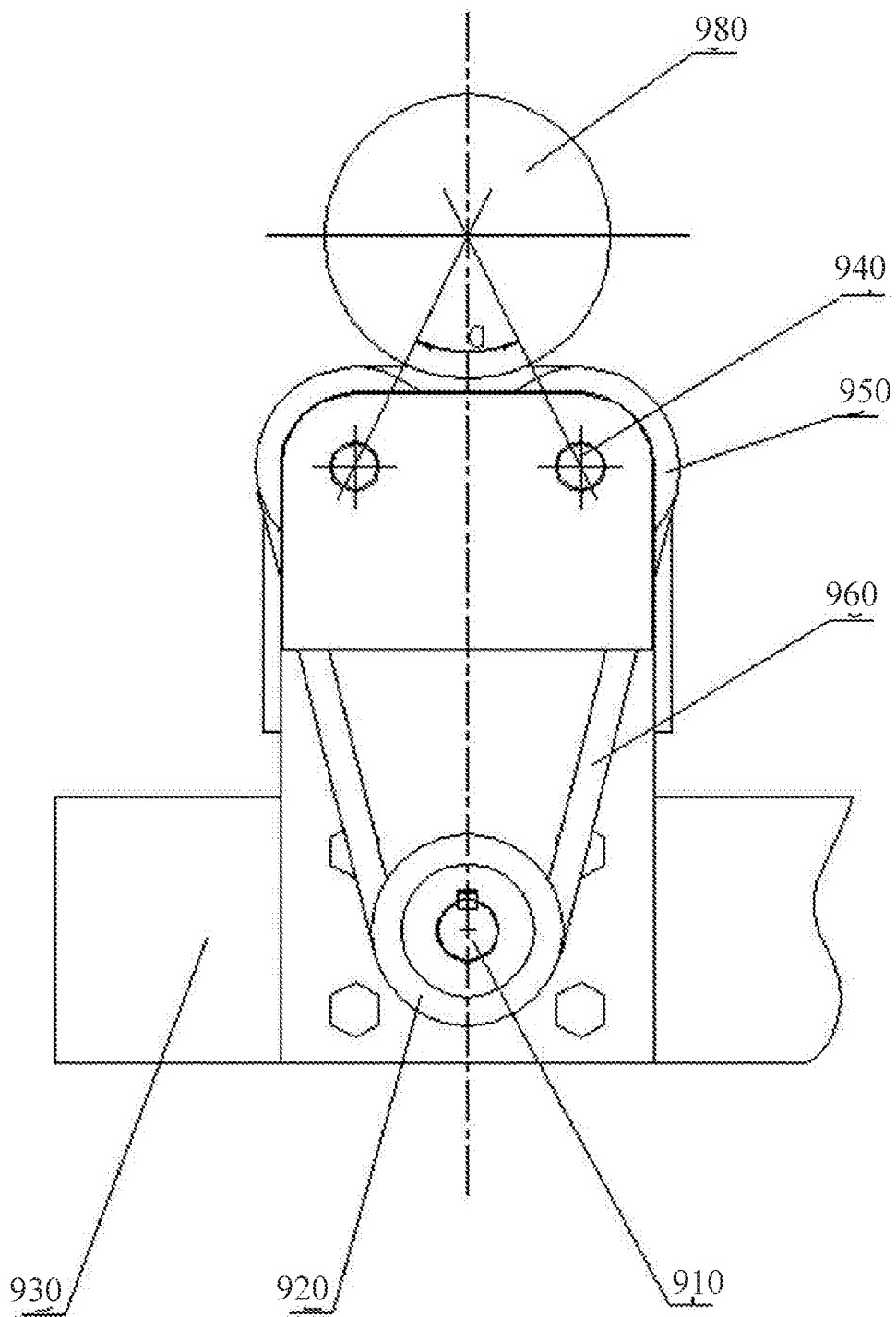
FIG. 30 is a schematic diagram illustrating a top view of the driver in FIG. 28.

FIG. 28 is a schematic diagram illustrating a driver for assisting a rotation of a hanger hanged on a drying line according to some embodiments of the present disclosure. FIG. 29 is a schematic diagram illustrating a side view of the driver in FIG. 28. FIG. 30 is a schematic diagram illustrating a top view of the driver in FIG. 28.

As shown in FIGS. 28-30, the driver for assisting the rotation of the hanger hanged on the drying line may include a spindle 910, a large belt pulley 920, a frame 930, a pin roll 940, a conveyance wheel 950, a belt 960, and a small belt pulley 970. The driver may be arranged in a production line for drying a module. For example, each driver may be arranged in a section on a side of the rail where the hanger is moved. The drive may be powered by the large belt pulley 920. Adjacent drivers may be linked by the belt 960. The frame 930 may be a main body skeleton of the driver. The frame 930 may be a T-shaped member. A surface of a horizontal strip of the frame 930 may be penetrated by the vertical spindle 910 at a middle position. An end of the spindle 910 may be equipped with the large belt pulley 920. Another end may be equipped with the small belt pulley 970, thereby forming a coaxial rotation structure on both sides of the frame 930. An extension plate located on one side of the frame 930 may be perpendicular to the surface of the horizontal strip. A plate surface of an outer end of the extension plate may be symmetrically arranged with two conveyance wheels 950. The two conveyance wheels 950 may be positioned by the pin roll 940. The small belt pulley 970 and the two conveyance wheels 950 may be located on a same side of the frame 930. The conveyance wheel 950 and the hanger 980 may be located on a same side, thereby forming a reduced conveyance structure. Therefore, an outer diameter D of the conveyance wheel 950 may be smaller than an outer diameter of the corresponding hanger 980. For example, a difference between the outer diameter D of the conveyance wheel 950 and the outer diameter of the corresponding hanger 980 may be 20 millimeters. In order to improve the friction efficiency and reduce a motion noise, the conveyance wheel 950 in the present disclosure may not be in directly contact with the hanger 980. The outer wall of the rubber belt 960 wound by the conveyance wheel 950 may be used for friction conveyance. The belt 960 may include a rubber triangle belt that a cross-section of the belt is an isosceles triangle. The belt 960 in the structure may be wound around the small belt pulley 970 and the two conveyance wheels 950, thereby forming a belt conveyance structure with a shape of an isosceles triangle. For example, an included angle α of the isosceles triangle in the embodiment may be equal to 30 degrees. An outer wall of the belt 960 at a bottom of the isosceles triangle in the structure may be in contact with the outer wall of the hanger 980 hanged on one side. The hanger 980 may be driven to rotate through a kinetic friction. Since the hanger 980 is rotated during the motion of the hanger 980, the hanged module may be driven to rotate with the hanger 980. In the drying room, since the dried module is rotated, each portion of the module may obtain a uniform drying condition. Therefore, the drying quality of the module may be guaranteed, which may create good base conditions for improving the quality of the castings.

FIG. 31 is a flowchart illustrating an exemplary process for ceramic shell making based on a production line for ceramic shell making according to some embodiments of the present disclosure.

In 3110, a plurality of modules may be placed onto a conveyor chain system.

The module may include a wax cluster. The module may include a plurality of sets of wax molds. In some embodiments, the module may include a horizontal rod for hanging. The conveyor chain system refers to a device that conveys a module to different stations. The conveyor chain system may be paused when the module is conveyed to one or more stations, so that the module may be performed a corresponding operation at the station. The conveyor chain system may include a suspension mechanism. The suspension mechanism may be fitted with the module to hang the module. In some embodiments, the placing the plurality of modules onto the conveyor chain system may be understood to place the plurality of modules on the suspension mechanism of the conveyor chain system. In some embodiments, a suspension mechanism may be used to convey a plurality of modules at a time. The conveyor chain system may include a plurality of suspension mechanisms. One of the plurality of suspension mechanisms may be firstly hanged with the modules, and then a next suspension mechanism may be hanged with the modules. In some embodiments, the suspension mechanism may include a rotation mechanism. The module hanged on the suspension mechanism may be rotated, so as to be dried. In some embodiments, two modules may be hanged on the conveyor chain system. That is, the conveyor chain system may be used to convey two modules at one time.

In some embodiments, operation 3110 may be performed by a controller of a feeding mechanism to control the feeding mechanism. In some embodiments, the controller of the feeding mechanism may be operably connected to a control center. Relevant instructions may be conveyed, by the control center, to the controller of the feeding mechanism so as to control a movement of the feeding mechanism. In some embodiments, the feeding mechanism refers to an actuator that can automatically hang the module onto the conveyor chain system by a program control. In some embodiments, the feeding mechanism may include an automatic feeding table or a robotic arm. In some embodiments, operation 3110 may also be performed manually. For example, the module may be manually hanged on the conveyor chain system by an operator on site.

In 3120, one or more modules among the plurality of modules may be conveyed to a station using the conveyor chain system.

The station (also referred to an operation station) refers to an operation area that performs a specific operation on the module. The station may include a removing and replacing station of a robotic arm. A motion state of the conveyor chain system may include a moving state and a parking state. In some embodiments, the motion state of the conveyor chain system may be controlled by a corresponding controller, for example, a programmable logic controller (PLC). In some embodiments, the controller of the conveyor chain system may be operably connected with the control center, so that the control center may control, according to the relevant instruction, the motion of the conveyor chain system. In some embodiments, the controller of the conveyor chain system may control a start and pause of the conveyor chain system, a motion speed of the conveyor chain system, a pause position of the conveyor chain system, and a dwell time at the pause position, etc. In some embodiments, after the module is conveyed to the station, the conveyor chain system may be parked. Subsequent operations may be performed by the robotic arm. In some embodiments, a monitoring and adjustment system for temperature and humidity may be disposed in an operation space of the conveyor chain system. The monitoring and adjustment system for temperature and humidity may be configured to inspect the temperature and humidity of the environment where the module is located in real time, and adjust the temperature and humidity when the temperature or humidity exceeds a limited range to ensure that the module is in an optimal operation environment.

In 3130, the one or more modules may be removed from the conveyor chain system using the robotic arm. The one or more modules may be coated in slurry and rained with sand at one or more stations.

In some embodiments, when the module is conveyed to a designated position via the conveyor chain system, the module may be removed by the robotic arm and performed one or more subsequent operations, for example, the slurry coating and/or the sanding. In some embodiments, the conveyor chain system may be stayed at the designated position, so that the module may be reliably removed by the robotic arm. In some embodiments, a dwell time of the conveyor chain system at the designated position may be adjusted according to a structure of the robotic arm and/or a count (number) of modules conveyed in parallel. In some embodiments, the designated position may indicate the removing and replacing station of the robotic arm. In some embodiments, the removing the one or more modules from the conveyor chain system using the robotic arm may be understood that after the module is conveyed to the removing and replacing station, the module may be removed, by the robotic arm, from the conveyor chain system at the removing and replacing station. In some embodiments, operation 3130 and operation 3140 may be performed at the one or more stations by a controller (e.g., a PLC) of the robotic arm to control the robotic arm. In some embodiments, the controller of the robotic arm may be operably connected with the control center, so that the control center may control, according to the relevant instruction, the motion of the robotic arm.

In some embodiments, the operation for slurry coating may include a slurry coating step and a slurry dripping step. In some embodiments, the operation for slurry coating may be performed on an auxiliary station and a first station. For example, for some special parts, a long time may be spent for the slurry coating. Therefore, the slurry coating step may be performed on the auxiliary station, and the slurry dripping step may be performed at the first station.

In some embodiments, the robotic arm may be caused to clamp the module to coat slurry. For example, the module may be removed from a conveyor chain of the conveyor chain system through a bending of the robotic arm on a module removing station. The module may be rotated to a slurry coating station (e.g., the first station) through a waist mechanism. When the module is coated in slurry, an arm of the robotic arm clamping the module may be first stretched downward, so that the module may be in contact with the slurry inside a slurry tank. In some embodiments, an extension direction of the arm of the robotic arm may include a vertically downward direction. That is, the arm of the robotic arm may be parallel to a rotation axis of a waist portion of the robotic arm, so that the module may be completely immersed downwardly in the slurry. In some embodiments, the arm of the robotic arm may also be at an angle to the rotation axis. At this time, the module may be placed in the slurry tank obliquely. The robotic arm may be caused to rotate the module to evenly coat an outer surface of the module in the slurry. In some embodiments, the angle may be within a range of 20 degrees to 80 degrees. In some embodiments, the angle may be within a range of 30 degrees to 70 degrees. In some embodiments, the angle may be within a range of 40 degrees to 60 degrees. In some embodiments, the angle may be equal to 45 degrees.

In some embodiments, after the module is coated in slurry, the module may be removed, by the robotic arm, from the slurry tank. The module may be lifted up from the slurry tank to allow slurry to drip. In some embodiments, the robotic arm may be at an angle to the rotation axis during the slurry dripping so as to improve the effect of the slurry dripping. In some embodiments, the angle between the robotic arm and the rotation axis may be within a range of 0 degrees to 90 degrees. In some embodiments, the angle may be within a range of 20 degrees to 80 degrees. In some embodiments, the angle may be within a range of 30 degrees to 70 degrees. In some embodiments, the angle may be within a range of 40 degrees to 60 degrees. In some embodiments, the angle may be equal to 45 degrees.

In some embodiments, after the operation for slurry coating is performed, the robotic arm may be caused to clamp the module to rotate around a waist axis to a sanding station for sanding. In some embodiments, during the operation for sanding, the robotic arm may be caused to clamp the module into a lower position of a sand material in a sanding machine. The sand material may be lowered at a region where the module is located. In the operation, the robotic arm may be driven to rotate the module, so that the module may be sanded uniformly. In some embodiments, a placement angle of the module may be inclined upward or downward during the operation for sanding. In some embodiments, a downward or upward inclined angle relative to a vertical direction may be within a range of 0 degrees to 90 degrees. In some embodiments, the angle may be within a range of 20 degrees to 80 degrees. In some embodiments, the angle may be within a range of 30 degrees to 70 degrees. In some embodiments, the angle may be within a range of 40 degrees to 60 degrees.

In some embodiments, the operation for slurry coating may include coating a multilayer slurry, such as 3 to 7 layers. Each operation for slurry coating may be performed to coat one layer of slurry in the multilayer slurry. The multilayer slurry may be divided into a surface layer (e.g., a first layer), a second layer (e.g., the second layer), and a rear layer (e.g., a third layer to a seventh layer). The operation for sanding may include sanding multiple times. In some embodiments, after the one or more modules are removed, by the robotic arm, from the conveyor chain system, the one or more modules may be performed the operation for slurry coating and the operation for sanding at the one or more stations. In some embodiments, the one or more modules may be clamped, by the robotic arm, to perform the operation for slurry coating and the operation for sanding on a same station. Alternatively, the one or more modules may be performed the operation for slurry coating at a first station, and performed the operation for sanding at a second station. In some embodiments, the one or more modules may be performed the operation for slurry coating at a plurality of stations. In some embodiments, the one or more modules may be performed the operation for sanding at the plurality of stations. In some embodiments, a count (number) of times for slurry coating may be the same as or different from a count (number) of times for sanding. More descriptions regarding specific operations performed at each station may be found in FIG. 5 and the descriptions thereof.

In 3140, the one or more modules may be removed onto the conveyor chain system using the robotic arm.

In some embodiments, the module removed to the conveyor chain system refers to a module performed the operation for sanding. The operation for sanding may be any layer of sand to be rained. For example, after a module is rained with a first layer of sand, the module may be clamped, by the robotic arm, to the removing and replacing station. At this time, the PLC may be triggered to control the robotic arm to hang the module back to the conveyor chain system. In some embodiments, the triggering motion may be performed manually. For example, a corresponding operation button may be manually controlled. Alternatively, the triggering motion may be performed by the control center according to the relevant instruction. In some embodiments, the removing the module to the conveyor chain system may be understood as that the module may be placed back to the suspension mechanism of the conveyor chain system using the robotic arm.

In some embodiments, the conveyor chain system in operation 3140 and the conveyor chain system in the above operation (e.g., operation 3110, operation 3120, or operation 3130) may be a same conveyor chain system, or different conveyor chain systems. That is, the module may be conveyed, by a conveyor chain system a, to the station of the robotic arm. The module may be removed, by the robotic arm, from the conveyor chain system a to perform an operation (e.g., the coating slurry, the sanding, etc.). After the operation is performed, the module may be hanged, by the robotic arm, to the conveyor chain system a or a conveyor chain system b. A subsequent operation may be performed after the module is conveyed by the conveyor chain system a or the conveyor chain system b.

In 3150, the one or more modules may be conveyed, using the conveyor chain system, to a drying process to be dried.

The module performed the drying process refers to a module after performed the operation for sanding. The operation for sanding may be any layer of sand to be rained. The time of the drying process may be within a range of 2 hours to 3 hours. The drying process may be performed by a drying device. The drying device refers to a device that controls a temperature, humidity, and airflow. In some embodiments, a device for monitoring the temperature and humidity may be disposed in the drying device. In some embodiments, the drying device may include a plurality of air conditioners and fans. The drying process may be controlled by controlling a temperature of the air conditioner and a rotation speed of the fan via the PLC. The fan refers to a fan with speed adjustment gears corresponding to different speeds. The speed adjustment gears may be adjusted, by the PLC, to dry the module according to a monitored drying degree of the module. In some embodiments, the controller of the drying device may also be operably connected with the control center. In some embodiments, the control center may calculate a time when the module is removed, using the robotic arm, onto the conveyor chain system. The control center may determine a time when the module is conveyed to the drying device. Further, the control center may cause the dry device to start when the module is conveyed to a position adjacent to the dry device. In some embodiments, a conveyance mode of the conveyor chain system may be set or adjusted by the control center according to a drying degree of the module. The conveyance mode may include a constant speed conveyance, a stepwise conveyance, etc. Parameters (e.g., a conveyance speed of the constant speed conveyance, an operation speed of the stepwise conveyance, an operation time, a waiting time, etc.) may be preset in an instruction sent to the control center. In some embodiments, the control center may also adjust an operation state of the conveyor chain system according to the drying effect of the conveyor chain system inspected in an actual situation. In some embodiments, the drying process may include causing the module to rotate so as to be uniformly air-dried when wind is blown to the module hanged on the conveyor chain system. A rotation device of the conveyor chain system may be caused the rotation of the module. After dried, the module may be conveyed to a subsequent operation. The subsequent operation may include coating a next layer of slurry or completing the ceramic shell making.

It should be noted that the above description of the process 3100 is merely provided for the purposes of illustration, and not intended to limit the scope of the present disclosure. For persons having ordinary skills in the art, multiple variations or modifications of the process 3100 may be made under the teachings of the present disclosure. However, those variations and modifications do not depart from the scope of the present disclosure. For example, operation 3130 may be divided into operation 3130-1 and operation 3130-2. In 3130-1, the module may be coated in slurry. In 3130-2, the module may be sanded. As another example, operation 3130 and operation 3140 may be combined into an operation. The operations for removing the module, coating the module in slurry, sanding the module, and hanging the module may be performed, by the robotic arm, on the module. In one or more embodiments of the present disclosure, terms "module" and "ceramic shell" may be understood as a ceramic shell to be processed or processed, such as a wax mold.

FIG. 32 is a flowchart illustrating an exemplary process for coating a first layer of slurry and raining a first layer of sand in a production line for ceramic shell making according to some embodiments of the present disclosure.

In some embodiments, a module may be removed from a conveyor chain system using a robotic arm. The module may be coated in slurry and sanded at one or more stations. The operation for slurry coating and the operation for sanding at the one or more stations may include an operation for coating a plurality of layers of slurry and an operation for raining a plurality of layers of sand. For example, the operation for coating the plurality of layers of slurry and an operation for raining the plurality of layers of sand may be an operation for coating 3 to 7 layers of slurry and raining 3 to 7 layers of sand. After each layer of slurry is coated and each layer of sand is rained among the operation for coating the plurality of layers of slurry and raining the plurality of layers of sand, the module may be coated in a next layer of slurry and rained with a next layer of sand. In some embodiments, the operation for coating the plurality of layers of slurry and the operation for raining the plurality of layers of sand may include a same operation. In some embodiments, the operation for coating the plurality of layers of slurry and the operation for raining the plurality of layers of sand may include a different operation. In some embodiments, a material used in the operation for coating the plurality of layers of slurry may be different from a material used in the operation for raining the plurality of layers of sand may include a same operation.

In some embodiments, coating the module in the first layer of slurry and raining the first layer of sand to the module in the production line for ceramic shell making may be controlled by a control center based on one or more control instructions. That is, the robotic arm may be caused, by the control center, to remove the module from the conveyor chain system to a designated position so as to be coated a first layer of slurry in a corresponding slurry tank of a slurry coating device and rained a first layer of sand using a sanding machine of a sanding device based on the one or more control instructions. The process 3200 may be used to describe the operation for coating the first layer of slurry and the operation for raining the first layer of sand. The operation for coating another layer of slurry and the operation for raining another layer of sand may be referred to the process 3200, which is not repeated. In some embodiments, the process 3200 may include the following operations.

In 3210, the robotic arm may be caused to clamp the module from the conveyor chain system.

Each arm structure of the robotic arm may further include a wrist structure and a hand structure. The robotic arm may be used to cause the arm structure of the robotic arm to move the hand structure to the module on the conveyor chain system. The hand structure may include a clamping device. The clamping device may be configured to clamp the module and fix the module on the hand structure. In some embodiments, the clamping device may include a pneumatic clamping mechanism. After the robotic arm clamps the module, the arm structure of the robotic arm may be caused to move the hand structure fixed with the module to a lowest position, so that the robotic arm may be caused to transfer a direction.

In 3220, the module may be caused, using the robotic arm, to rotate to a first station. A first slurry tank including the first layer of slurry may be transferred to a slurry coating station so as to coat the module in the first layer of slurry.

The first station refers to a station for coating the module in the slurry. In some embodiments, the first station may correspond to a station where a robotic arm with four directions and eight arms is turned by 180 degrees. In some embodiments, the first station may also correspond to a station where a robotic arm with three directions and six arms is turned by 120 degrees. A waist portion of the robotic arm may be turned under a control of a PLC system. The module may be transferred to the first station. The first station may be disposed with a slurry coating device as described in FIG. 2 in the present disclosure. In some embodiments, the PLC system may be understood as the control center as described above. When the module is transferred to the first station, the arm structure of the robotic arm may lift the module to a certain height to avoid collision with the slurry coating device. The slurry coating device may automatically transfer a slurry tank. In some embodiments, the slurry coating device may transfer the slurry tank (e.g., transfer a first slurry tank including the first layer of slurry to the slurry coating station) while the robotic arm is turned. In some embodiments, the slurry tank may be transferred when the robotic arm is removing or replacing (e.g., hanging) the module.

In some embodiments, after the module is moved to a position above the transferred slurry tank, the robotic arm may control the arm portion of the robotic arm to sink the module into the slurry tank. The module may be completely immersed by the slurry. A step for slurry coating may be performed on the module. When the module is sunk, the module may be tilted or vertical. After the module is immersed by the slurry, the robotic arm may control the wrist structure of the robotic arm to rotate. Therefore, the module may be driven to rotate. The rotation may be a rotation along a same direction. The rotation of the wrist structure of the robotic arm may be operated in parallel with the movement of the arm structure, thereby improving the efficiency of the robotic arm. A time to coat the module in the slurry may be within a range of 20 seconds to 30 seconds. After the step for slurry coating is performed, the robotic arm may control the arm structure of the robotic arm to lift the module to a top portion of the slurry coating tank so as to perform a step for dripping slurry. When the module is lifted and after the module is lifted to a highest position, the robotic arm may control the wrist structure of the robotic arm to rotate in alternate directions, and drive the module to perform the same rotation. In some embodiments, the rotation in the alternate directions may be two rotations forwards and backwards. A time for dripping slurry may be within a range of 20 seconds to 30 seconds. In some embodiments, a total of the operation for slurry coating may be within a range of 55 seconds to 60 seconds. In some embodiments, an area of the slurry coating device may also be disposed with a video monitoring device. During the operation for slurry coating, if the module falls off to the slurry tank, the situation of the module falling may be discovered by the video monitoring device. Further, a warning may be issued so as to inform an operator to deal with the situation.

In 3230, the module may be caused, by the robotic arm, to rotate to a second station. A sanding machine including the first layer of sand may be moved to a sanding station so as to rain the first layer of sand to the module.

The second station refers to a station for sanding the module. In some embodiments, the second station may correspond to a station where the robotic arm with four directions and eight arms is turned by 270 degrees. In some embodiments, the second station may also correspond to a station where the robotic arm with three directions and six arms is turned by 240 degrees. The waist portion of the robotic arm may be turned under a control of the PLC system. The module may be transferred to the second station from the first station. The second station may be disposed with a sanding device as described in FIG. 9 in the present disclosure. When the module is transferred to the second station, the arm structure of the robotic arm may lower the module to the lowest height to wait for the transfer of the sanding device. The sanding device may include a plurality of sanding machines. An area of the second station may be disposed with a guide rail for moving one or more sanding machines. The sanding machine may be controlled, by the PLC system, to move on the rail. In some embodiments, when the module is rotated to the second station, the sanding machine including the first layer of sand may be moved to the second station. When the sanding machine including the first layer of sand is moved to the second station, the robotic arm may control the arm portion of the robotic arm to lift the module to a sanding position of the sanding machine so as to sand the module. After the module is sanded, the module may be lowed, by the robotic arm, from the sanding machine to the lowest position. The sanding machine may be moved to another position (e.g., a waiting area) for standby. In some embodiments, a total of the operation for sanding may be within a range of 55 seconds to 60 seconds.

In 3240, the robotic arm may be caused to rotate the sanded module to the removing and replacing station. The sanded module may be hanged back to the conveyor chain system.

In some embodiments, after the module is sanded, the waist portion of the robotic arm may be turned a direction so as to turn an operation direction of the module to a position corresponding to 0 degrees. After the module is turned to the position corresponding to 0 degrees, the robotic arm may be triggered to hang the module. The arm structure of the robotic arm may lift the module and hang the module to the conveyor chain system.

In some embodiments, the operation for coating the first layer of slurry and raining the first layer of sand in the production line for ceramic shell making may further include rotating the module to an auxiliary station so as to perform an auxiliary operation. The auxiliary station may correspond to a station where the robotic arm with four directions and eight arms is turned by 90 degrees. The auxiliary operation may include pre-immersing the module, pretreating the module before coating the module in slurry, or the like, or any combination thereof.

It should be noted that the above description of the process 3200 is merely provided for the purposes of illustration, and not intended to limit the scope of the present disclosure. For persons having ordinary skills in the art, multiple variations or modifications of the process 3200 may be made under the teachings of the present disclosure. However, those variations and modifications do not depart from the scope of the present disclosure. For example, operation 3220 may be divided into operation 3220-1, operation 3220-2, and operation 3220-3. In 3220-1, the slurry tank may be transferred. In 3220-2, the robotic arm may be rotated. In 3220-3, the module may be coated in slurry. As another example, operation 3230 may be divided into operation 3230-1, operation 3230-2, and operation 3230-3. In 3230-1, the robotic arm may be rotated. In 3230-2, the sanding machine may be transferred. In 3220-3, the module may be sanded.

The production line for ceramic shell making the disclosed in the present disclosure may include, but not be limited to, the following benefits. (1) The production line for ceramic shell making may have a high degree of automation. Only a small amount of manual operation may be required, which may greatly save labor costs. (2) Multiple operations of the robotic arm may be performed in parallel, which may greatly improve the efficiency of the operation. (3) The operation for slurry coating and sanding may be accurately controlled. The effect of ceramic shell making may be good. (4) The module may be rotated during the conveyance operation and the drying process, so that the module may be dried uniformly.

The above descriptions are only preferred embodiments of the present disclosure, not intended to limit the present disclosure. These alterations, improvements, and modifications are intended to be suggested by this disclosure, and are within the spirit and scope of the exemplary embodiments of this disclosure.

What is claimed is:

1. A production line for ceramic shell making, comprising:
   a conveyor chain system configured to convey a batch of modules;
   a robotic arm configured to remove and replace one or more modules among the batch of modules relative to the conveyor chain system and hold the one or more modules during a plurality of subsequent operations, the robotic arm being configured to be moveable to a plurality of positions each of which corresponds to one of a plurality of stations;
   a slurry coating device configured to coat the one or more modules in slurry;
   a sanding device configured to sand the one or more modules, the sanding device including a plurality of sanding machines; and
   a control center, wherein
      the control center is operably connected with the conveyor chain system and the robotic arm, respectively, to cause, based on a first instruction, the conveyor chain system and the robotic arm to cooperate with each other; and
      the control center is operably connected with the sanding device to cause, based on a second instruction, a sanding machine including a corresponding type of sand to move to a second designated position.

2. The production line of claim 1, the slurry coating device including a plurality of slurry tanks, wherein
   the control center is operably connected with the slurry coating device to cause, based on a third instruction, the slurry coating device to move so as to transfer a slurry tank including a corresponding type of slurry to a first designated position.

3. The production line of claim 2, the slurry coating device including a carousel configured to rotate in a controlled manner, the plurality of slurry tanks being disposed on the carousel, wherein
   the carousel is configured to rotate, based on the third instruction, to transfer the slurry tank including the corresponding type of slurry to the first designated position.

4. The production line of claim 3, the slurry coating device further including one or more rotation bases configured for one or more of the plurality of slurry tanks, wherein
   each of the one or more rotation bases is configured to drive a corresponding slurry tank to rotate.

5. The production line of claim 1, the sanding device including a powered motion mechanism, wherein
   the control center is configured to cause the sanding machine including the corresponding type of sand to move, by the powered motion mechanism, to the second designated position.

6. The production line of claim 1, wherein the production line further includes a drying device, wherein
   the control center is operably connected with the drying device to cause, based on an instruction for drying, the conveyor chain system, the robotic arm, and the drying device to cooperate with each other.

7. The production line of claim 6, wherein the drying device is configured to dry the one or more modules during a drying process, including:
   causing the one or more modules to rotate so as to be uniformly air-dried when wind is blown to the one or more modules hanged on the conveyor chain system.

8. A method for ceramic shell making using a production line, the method comprising:
   placing a plurality of modules onto a conveyor chain system;
   conveying one or more modules among the plurality of modules to a station using the conveyor chain system;
   removing, using a robotic arm, the one or more modules from the conveyor chain system, and coating the one or more modules in one or more layers of slurry and sanding the one or more modules with one or more layers of sand at one or more stations, wherein for each of the one or more layers of slurry, a corresponding slurry tank of the slurry coating device is caused to shift to coat the layer of slurry, and for each of the one or more layers of sand, a corresponding sanding machine of the sanding device is caused to shift to rain the layer of sand;

replacing, using the robotic arm, the one or more modules onto the conveyor chain system; and conveying, using the conveyor chain system, the one or more modules to a drying process to be dried.

9. The method of claim 8, wherein during the step for each of the one or more layers of slurry, the corresponding slurry tank of the slurry coating device is caused to shift to coat the layer of slurry, and for each of the one or more layers of sand, the corresponding sanding machine of the sanding device is caused to shift to rain the layer of sand, the step including:

for each layer of the one or more layers of slurry and each layer of the one or more layers of sand, causing the slurry coating device to move so as to transfer the corresponding slurry tank to a first designated position;

causing the sanding device to move so as to transfer the corresponding sanding machine to a second designated position; and causing the one or more modules to be removed from the conveyor chain system using the robotic arm, moved to a position where the corresponding slurry tank is located to be coated in the layer of slurry, and moved to a position where the corresponding sanding machine is located to be rained in the layer of sand.

10. The method of claim 9, wherein the robotic arm causes the one or more modules to rotate during the coating of each of the one or more layers of slurry and the raining of each of the one or more layers of sand.

11. The method of claim 8, wherein the drying process includes:

causing the one or more modules to rotate so as to be uniformly air-dried when wind is blown to the one or more modules hanged on the conveyor chain system.

\* \* \* \* \*